US012482921B2

(12) United States Patent
Wu et al.

(10) Patent No.: US 12,482,921 B2
(45) Date of Patent: Nov. 25, 2025

(54) ANTENNA AND TERMINAL

(71) Applicant: Huawei Technologies Co., Ltd., Shenzhen (CN)

(72) Inventors: Pengfei Wu, Shanghai (CN); Lijun Ying, Shanghai (CN); Hanyang Wang, Reading (GB); Dong Yu, Shanghai (CN); Meng Hou, Shanghai (CN); Chien-Ming Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 17/915,763

(22) PCT Filed: Mar. 31, 2021

(86) PCT No.: PCT/CN2021/084786

§ 371 (c)(1),
(2) Date: Sep. 29, 2022

(87) PCT Pub. No.: WO2021/197399

PCT Pub. Date: Oct. 7, 2021

(65) Prior Publication Data

US 2023/0223677 A1 Jul. 13, 2023

(30) Foreign Application Priority Data

Mar. 31, 2020 (CN) ......................... 202010247465.2

(51) Int. Cl.

| | |
|---|---|
| ***H01Q 1/24*** | (2006.01) |
| ***H01Q 5/328*** | (2015.01) |
| ***H01Q 5/50*** | (2015.01) |
| ***H01Q 9/42*** | (2006.01) |

(52) U.S. Cl.
CPC ............. *H01Q 1/243* (2013.01); *H01Q 5/328* (2015.01); *H01Q 5/50* (2015.01); *H01Q 9/42* (2013.01)

(58) Field of Classification Search
CPC .......... H01Q 1/243; H01Q 5/328; H01Q 5/50; H01Q 9/42
See application file for complete search history.

(56) References Cited

U.S. PATENT DOCUMENTS

| | | | | |
|---|---|---|---|---|
| 10,193,597 | B1 * | 1/2019 | Garrido Lopez ........ | H04B 1/38 |
| 10,396,438 | B1 | 8/2019 | Smith et al. | |
| 2005/0280579 | A1 | 12/2005 | Liang et al. | |

(Continued)

FOREIGN PATENT DOCUMENTS

| | | |
|---|---|---|
| CN | 103441330 A | 12/2013 |
| CN | 104115331 A | 10/2014 |

(Continued)

*Primary Examiner* — Graham P Smith
(74) *Attorney, Agent, or Firm* — Conley Rose, P.C.

(57) ABSTRACT

An antenna includes a first radiator, a second radiator, and a feed. The first radiator has a first feed point and a first ground point. The second radiator has a second feed point and a second ground point. The antenna further includes a connection line. The connection line has a first end and a second end that are opposite to each other. The first end is coupled to the first feed point of the first radiator, and the second end is coupled to the second feed point of the second radiator. A feeding point is disposed on the connection line, and the feeding point is coupled to the feed.

20 Claims, 23 Drawing Sheets

(56) References Cited

U.S. PATENT DOCUMENTS

| | | | |
|---|---|---|---|
| 2011/0134009 A1 | 6/2011 | Onaka et al. |
| 2016/0087667 A1 | 3/2016 | Li |
| 2016/0301134 A1 | 10/2016 | Li et al. |
| 2018/0159220 A1 | 6/2018 | Kuroda et al. |
| 2019/0334254 A1 | 10/2019 | Wu |
| 2022/0209403 A1 | 6/2022 | Li et al. |

FOREIGN PATENT DOCUMENTS

| | | | |
|---|---|---|---|
| CN | 105244599 | A | 1/2016 |
| CN | 105428787 | A | 3/2016 |
| CN | 205081230 | U | 3/2016 |
| CN | 205452544 | U | 8/2016 |
| CN | 106025519 | A | 10/2016 |
| CN | 106159443 | A | 11/2016 |
| CN | 106450697 | A | 2/2017 |
| CN | 106972260 | A | 7/2017 |
| CN | 107069212 | A | 8/2017 |
| CN | 108123210 | A | 6/2018 |
| CN | 108270082 | A | 7/2018 |
| CN | 108281766 | A | 7/2018 |
| CN | 208849070 | U | 5/2019 |
| CN | 110247160 | A | 9/2019 |
| CN | 110492232 | A | 11/2019 |
| EP | 3190655 | A1 | 7/2017 |
| EP | 4087056 | A1 | 11/2022 |

* cited by examiner

@0.9GHz

@0.8GHz

@0.82GHz

@0.88GHz

@0.84GHz

@2.31GHz

@2.59GHz

ANTENNA AND TERMINAL

CROSS-REFERENCE TO RELATED APPLICATIONS

This is a U.S. National Stage of International Patent Application No. PCT/CN2021/084786 filed on Mar. 31, 2021, which claims priority to Chinese Patent Application No. 202010247465.2 filed on Mar. 31, 2020. Both of the aforementioned applications are hereby incorporated by reference in their entireties.

TECHNICAL FIELD

This application relates to the field of antenna technologies, and in particular, to an antenna and a terminal.

BACKGROUND

With rapid development of key technologies such as curved and flexible screens, thinning and an ultimate screen-to-body ratio of a terminal, especially a mobile phone, have become a trend. This design greatly reduces antenna space. In addition, the mobile phone has an increasingly high requirement for some functions, such as photographing. This leads to a gradual increase in a quantity and size of cameras and as well as complexity of an antenna design in the mobile phone. In such a pressing environment, a multi-antenna system usually has insufficient space for design, or fails to achieve high system isolation or a high envelope correlation coefficient (envelope correlation coefficient, ECC) in arrangement. Consequently, it is difficult to meet performance requirements of a communication frequency band. Especially, in a current state, 3G, 4G, and 5G frequency bands will coexist as mobile phone communication frequency bands for a long time. This leads to an increasing quantity of antennas, a wider frequency band coverage, and more serious mutual impact.

SUMMARY

This application provides an antenna and a terminal, to improve antenna isolation and improve a communication effect of the terminal.

According to a first aspect, an antenna is provided and applied to a terminal. The antenna includes a first radiator, a second radiator, and a feed. The first radiator has a first feed point and a first ground point, and the second radiator has a second feed point and a second ground point. In addition, the antenna further includes a connection line. The connection line has a first end and a second end that are opposite to each other, the first end is connected to the first feed point of the first radiator, and the second end is connected to the second feed point of the second radiator. A feeding point is disposed on the connection line, and the feeding point is connected to the feed. There is no other direct electrical connection between the first radiator and the second radiator except the connection line. In the foregoing technical solution, the feed feeds power to different first radiators and second radiators through the connection line, so as to generate more resonance and increase a bandwidth of an antenna.

In a specific implementation solution, both ends of the first radiator are open ends. The second ground point of the second radiator is located at one end of the second radiator, and the other end of the second radiator is an open end. This increases isolation between the two radiators.

In a specific implementable solution, the terminal has a metal frame, the metal frame is provided with a plurality of openings, and the plurality of openings divide the metal frame into a plurality of metal segments. The first radiator and the second radiator are two different metal segments of the metal frame. The metal frame is used as a radiator of the antenna.

In a specific implementation solution, the metal frame has two opposite long side walls and two opposite short side walls.

The first radiator includes a part of one long side wall and a part of one short side wall, and the second radiator is a part of the other long side wall. This increases a distance between radiators.

In a specific implementation solution, the metal frame has two opposite long side walls and two opposite short side walls. The first radiator is a part of one long side wall, and the second radiator is a part of the other long side wall. This increases a distance between radiators.

In a specific implementation solution, the metal frame has two opposite long side walls and two opposite short side walls.

The first radiator includes a part of one long side wall and a part of one short side wall, and the second radiator includes a part of the other long side wall and a part of one short side wall. This increases a distance between radiators.

In a specific implementable solution, the first end and the second end of the connection line are connected to the two long side walls in a one-to-one correspondence.

In a specific implementable solution, the terminal has a circuit board, and the feed is disposed on the circuit board. In a length direction of the short side wall, the first end and the second end of the connection line cross a gap between the circuit board and the metal frame, and are connected to the two long side walls of the metal frame. This implements connection between the connection line and the radiator.

In a specific implementation solution, two opposite supports are disposed in the terminal. The first radiator is a metal layer disposed on one support, and the second radiator is a metal layer disposed on the other support. The two radiators are supported by the supports.

In a specific implementation solution, the antenna further includes a first feed network. A negative electrode of the feed is grounded, and a positive electrode of the feed is connected to the feeding point through the first feed network. This improves a feeding effect.

In a specific implementable solution, the feeding point is connected to a first metal wire. The positive electrode of the feed is connected to an end that is far away from the feeding point and that is of the first metal wire. A second metal wire and a third metal wire are further connected to the end that is far away from the feeding point and that is of the first metal wire. Ends that are far away from the first metal wire and that are of the second metal wire and the third metal wire are separately grounded.

In a specific implementable solution, a first matching network includes a first capacitor disposed on the first metal wire, a first inductor disposed on the third metal wire, and a second inductor disposed on the second metal wire.

In a specific implementable solution, the connection line includes a first connection line and a second connection line.

The first connection line is connected to the first radiator, and the second connection line is connected to the second radiator.

An end that is far away from the first radiator and that is of the first connection line is connected to a fourth metal wire, and an end that is far away from the first connection line and that is of the fourth metal wire is grounded. An end that is far away from the second radiator and that is of the second connection line is connected to a fifth metal wire, and an end that is far away from the second connection line and that is of the fifth metal wire is grounded.

A positive electrode of the feed is connected to the fifth metal wire, and a negative electrode of the feed is connected to the fourth metal wire.

In a specific implementable solution, the antenna further includes a second matching network. The second matching network includes a third inductor, a fourth inductor, and a second capacitor. The third inductor is disposed on the fifth metal wire, the fourth inductor is disposed on the fourth metal wire, and the second capacitor is disposed between the first connection line and the second connection line. This improves performance of the antenna.

According to a second aspect, an antenna is provided. The antenna includes a radiator and a feed network. The radiator includes a first radiator and a second radiator that are symmetrically disposed, and lengths of the first radiator and the second radiator may be determined according to a requirement, which is not specifically limited herein. The feed network is configured to separately feed power to the first radiator and the second radiator. The feed network includes a first feed network and a second feed network. The first feed network includes a first feed, a first feed line, and a second feed line. A negative electrode of the first feed is grounded, a positive electrode of the first feed is connected to the first feed line and the second feed line, the first feed line is connected to the first radiator, and the second feed line is connected to the second radiator. The second feed network includes a second feed, a third feed line, and a fourth feed line. A positive electrode of the second feed is connected to the third feed line, and a negative electrode of the second feed is connected to the fourth feed line. The third feed line is connected to the first radiator, and the fourth feed line is connected to the second radiator. In the foregoing technical solution, antenna isolation can be improved by using the first feed network and the second feed network to feed power to the first radiator and the second radiator that have approximately an equal current path length. When the first feed network or the second feed network is used to feed power to the first radiator and the second radiator that have different current path lengths, a bandwidth of the antenna can be increased, so that performance of the antenna can be improved.

In a specific implementable solution, the first feed line is connected to the second feed line, a first metal wire is connected to a joint connecting the first feed line and the second feed line, and the positive electrode of the first feed is connected to an end that is away from the first feed line and that is of the first metal wire. The end that is far away from the first feed line and that is of the first metal wire is separately connected to a second metal wire and a third metal wire. Ends that are far away from the first metal wire and that are of the second metal wire and the third metal wire are separately grounded.

In a specific implementation solution, the positive electrode of the first feed is connected to the first feed line and the second feed line through a first matching network. This improves performance of the antenna.

In a specific implementable solution, a first matching network includes a first capacitor disposed on the first metal wire, a first inductor disposed on the third metal wire, and a second inductor disposed on the second metal wire. This improves performance of the antenna.

In a specific implementable solution, a first end of the third feed line is electrically connected to the first radiator, and a first end of the fourth teed line is connected to the second radiator.

A second end of the third feed line is connected to a fourth metal wire, and an end that is far away from the third feed line and that is of the fourth metal wire is grounded. A second end of the fourth feed line is connected to a fifth metal wire, and an end that is far away from the fourth feed line and that is of the fifth metal wire is grounded. The positive electrode of the second feed is connected to the fifth metal wire, and the negative electrode of the second feed is connected to the fourth metal wire.

In a specific implementable solution, the second feed is correspondingly connected to the third feed line and the fourth feed line through a second matching network. This improves performance of the antenna.

In a specific implementable solution, the second matching network includes a third inductor, a fourth inductor, and a second capacitor. The third inductor is disposed on the fifth metal wire, the fourth inductor is disposed on the fourth metal wire, and the second capacitor is disposed between the second end of the third feed line and the second end of the fourth feed line. This improves performance of the antenna.

In a specific feasible implementation solution, a ratio of a current path length of the first radiator to a current path length of the second radiator is between 0.8 and 1.2.

In a specific feasible implementation solution, the current path length of the first radiator is the same as the current path length of the second radiator.

In a specific feasible implementation solution, one end of the first radiator is suspended, and the other end is grounded. One end of the second radiator is suspended, and the other end is grounded.

The suspended end of the first radiator and the suspended end of the second radiator are located on a same side; or the suspended end of the first radiator and the suspended end of the second radiator are located on different sides. The radiator of the antenna may be ground in different manner.

In a specific feasible implementation solution, the current path length of the first radiator and the current path length of the second radiator each are a quarter of a wavelength corresponding to an operating frequency band of the antenna.

In a specific implementation solution, a phase shifter is disposed on the feed line of the feed network.

According to a third aspect, a terminal is provided. The terminal includes a housing, and the antenna or the antenna array according to any one of the foregoing implementations disposed in the housing. In the foregoing technical solution, antenna isolation can be improved by using the first feed network and the second feed network to feed power to the first radiator and the second radiator that have approximately an equal current path length. When the first feed network or the second feed network is used to feed power to the first radiator and the second radiator that have different current path lengths, the first antenna and the second antenna may be fed at the same time. This increases the bandwidth of the antenna and improves performance of the antenna.

In a specific implementation solution, the housing is a metal housing. The metal housing includes a plurality of metal segments, and the first radiator and the second radiator are two metal segments in the plurality of metal segments. This facilitates antenna configuration.

DESCRIPTION OF EMBODIMENTS

To make the objectives, technical solutions, and advantages of this application clearer, the following further describes this application in detail with reference to the accompanying drawings.

Figure 1:
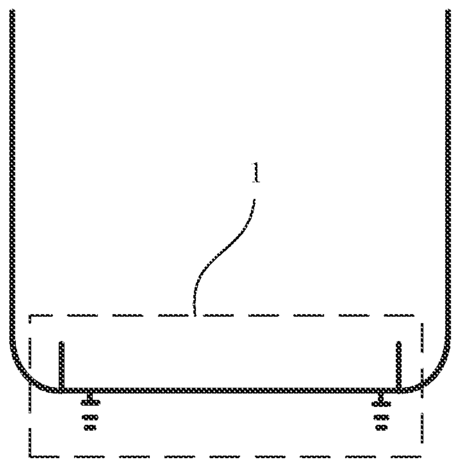
FIG. 1 shows a conventional MIMO dual-antenna design.

For ease of understanding, an application scenario of an antenna provided in embodiments of this application is first described. The antenna provided in embodiments of this application is applied to an electronic device such as a mobile phone, a tablet computer, a PC, a router, or a wearable device. A mobile phone is used as an example. The mobile phone includes a metal housing. The metal housing includes a plurality of metal segments. The plurality of metal segments are electrically isolated from each other, and some of the metal segments may be used as radiators of the antenna. FIG. 1 shows an example of a conventional MIMO dual-antenna design. The antennas are far away from each other, and integrally occupy a large area on a mobile phone as a whole. In addition, when a low-frequency single frequency band is covered, isolation is only 10 dB, and ECC is about 0.4. The same is true for a medium-high frequency MIMO antenna. However, 3G, 4G, and 5G frequency bands will coexist as mobile phone communication frequency bands for a long time. This leads to an increasing quantity of antennas, a wider frequency band coverage, and more serious mutual impact. Therefore, an embodiment of this application provides an antenna. The following describes the antenna in detail with reference to specific accompanying drawings and embodiments.

First, the antenna provided in embodiments of this application may be applied to a communication system that has been used or is to be applied to a terminal, for example, a long term evolution (long term evolution, LTE) system, a Wi-Fi system, a SUB-6G system, or a 5G system. An antenna in the following examples does not highlight a requirement of a communication network, and only a frequency value is used to describe an operating characteristic of the antenna.

In addition, the antenna provided in embodiments of this application is simulated based on the following environment: A housing of a mobile phone has a metal frame, and a PCB board and an LDS support are disposed in space enclosed by the metal frame. The metal frame, the LDS support, and the PCB board are known structures in an existing mobile phone. Therefore, details are not described herein. The metal frame has a thickness of 4 mm and a width of 3 mm. Antenna clearance in a Z-direction (a direction perpendicular to a terminal display plane) projection area is 1 mm. A width of a groove on the metal frame is 2 mm. A dielectric constant of a filling material among the LDS support, the groove on the metal frame, the metal frame and floor is 3.0, and a loss angle is 0.01.

Figure 2:
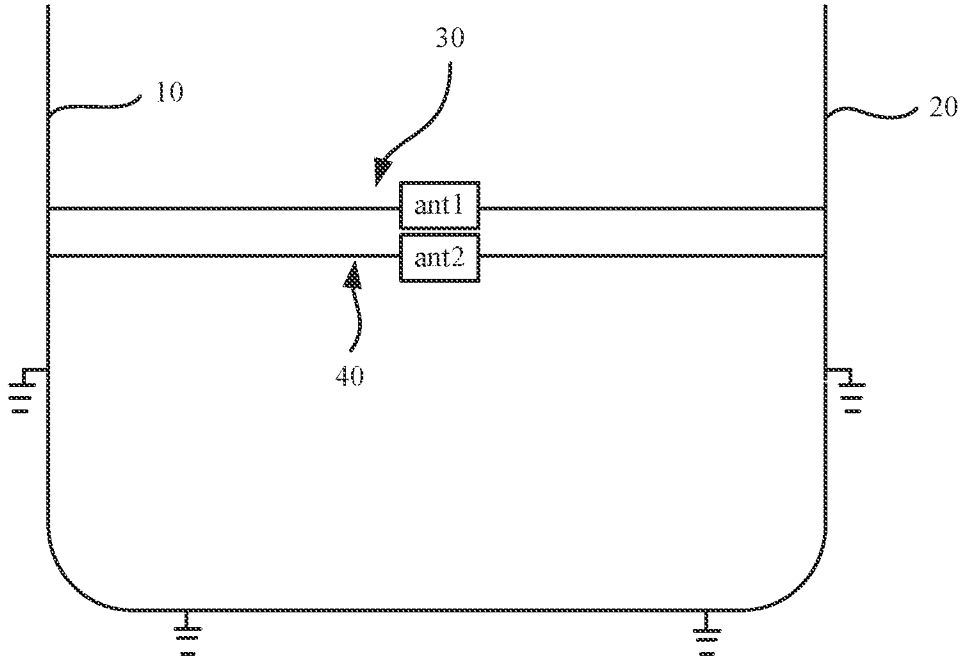
FIG. 2 shows a low-frequency antenna used in an embodiment of this application.

FIG. 2 shows an example of a low-frequency antenna used in an embodiment of this application. The low-frequency antenna includes two radiators that are symmetrically disposed. For ease of description, the two radiators are respectively named a first radiator 10 and a second radiator 20. The first radiator 10 and the second radiator 20 use an IFA structure in a form of a metal frame. The first radiator 10 and the second radiator 20 are symmetrically disposed relative to an axis O of a mobile phone. A lower end of each radiator is grounded, and an upper end of the radiator is open (a preventing direction of a terminal in FIG. 2 is used as a reference direction). A length of each radiator is not limited in this embodiment of this application. For example, a ratio of a current path length of the first radiator 10 to a current path length of the second radiator 20 is between 0.8 and 1.2. It is only required that the current path length of the first radiator 10 is the same as or approximately the same as the current path length of the second radiator 20. A length of each radiator may be set according to a requirement. For example, the length of each radiator is approximately ¼ of a wavelength corresponding to an operating frequency band of the low-frequency antenna. For example, the length is corresponding to ⅙ to ⅓ of the wavelength corresponding to the operating frequency band of the low-frequency antenna, for example, for example ⅙, ¼, ⅓ or the like of the wavelength. In addition, the first radiator 10 and the second radiator 20 provided in this embodiment of this application are not limited to a form of using the metal frame shown in FIG. 2, and may further use another form, for example, use another structure form such as a flexible circuit, a metal layer, or a printed circuit on a printed circuit board to form an IFA structure.

Still refer to FIG. 2. The low-frequency antenna provided in this embodiment of this application further includes a feed network. The feed network in FIG. 2 includes two parts: a first feed network 40 and a second feed network 30. For example, the first feed network 40 is a symmetric feed network, and the second feed network 30 may be an anti-symmetric feed network. The low-frequency antenna shown in FIG. 2 includes two sub-antennas: an antenna ant1, where the second feed network 30 is separately connected to the first radiator 10 and the second radiator 20; and an antenna ant2, where the first feed network 40 is separately connected to the first radiator 10 and the second radiator 20.

Figure 3:
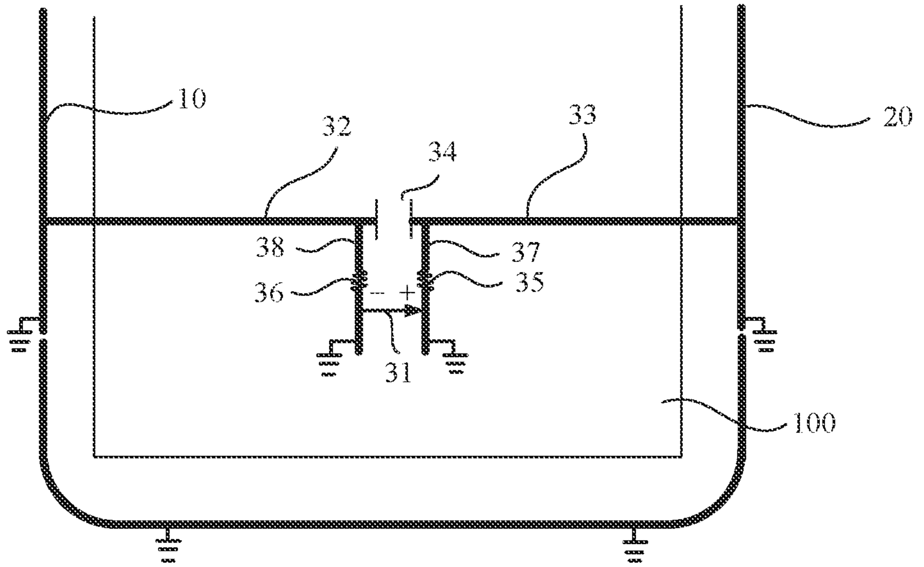
FIG. 3 shows a specific structural form of an antenna ant1.

FIG. 3 shows an example of a specific structure form of an antenna ant1. The antenna ant1 includes the first radiator 10, the second radiator 20, and the second feed network 30. The second feed network 30 is an anti-symmetric feed network, and includes a second feed 31, a third feed line 32, and a fourth feed line 33. As shown in FIG. 3, the third feed line 32 and the fourth feed line 33 that owe opposite to each other are disposed on a PCB board 100. The third feed line 32 and the fourth feed line 33 may be printed circuits or metal layers. A first end of the third feed line 32 extends from the PCB board 100 to the first radiator 10 and is electrically connected to the first radiator 10, or a first end of the third feed line 32 is connected to the first radiator 10 by using a metal wire. A first end of the fourth feed line 33 extends from the PCB board 100 to the second radiator 20 and is connected to the second radiator 20, or the fourth feed line 33 is connected to the second radiator 20 by using a metal wire. The second feed 31 of the second feed network 30 is located between a second end of the third feed line 32 and a second end of the fourth feed line 33. As shown in FIG. 3, the second end of the third feed line 32 is connected to a fourth metal wire 38, and an end that is far away from the third feed line and that is of the fourth metal wire 38 is grounded. The second end of the fourth feed line 33 is connected to a fifth metal wire 37, and an end that is far away from the fourth feed line 33 and that is of the fifth metal wire 37 is grounded. The third feed line 32 and the fourth feed line 33 are disposed symmetrically, and the fourth metal wire 38 and the fifth metal wire 37 are also disposed symmetrically. As shown in FIG. 3, a negative electrode (− in the figure) of the second feed 31 is connected to the third feed line 32 by using the fourth metal wire 38, and a positive electrode (+ in the figure) of the second feed 31 is connected to the fourth feed line 33 by using the fifth metal wire 37. By using the third feed line 32 and the fourth feed line 33, a connection "bridge" structure is formed between the second feed network 30 and the two radiators.

In FIG. 3, the third feed line 32 and the fourth feed line 33 are symmetrically disposed, so that a current path length of the third feed line 32 is the same as a current path length of the fourth feed line 33. The fourth metal wire 38 and the fifth metal wire 37 are symmetrically disposed, so that a current path length of the fourth metal wire 38 is the same as a current path length of the fifth metal wire 37. However, during actual disposing, due to an assembly error or a space problem of disposing the second feed 31, there may be a difference between the third feed line 32 and the fourth feed line 33, or there may be a difference between the fourth metal wire 38 and the fifth metal wire 37. When the difference occurs, optionally, a symmetric matching network design may be added to the second feed network 30, and is named a second matching network for ease of description. For example, the second matching network may include a third inductor 35, a fourth inductor 36, and a second capacitor 34. The third inductor 35 is disposed on the fifth metal wire 37, the fourth inductor 36 is disposed on the fourth metal wire 38, and the second capacitor 34 is disposed between the second end of the third feed line 32 and the second end of the fourth feed line 33. By adjusting an inductance value of the third inductor 35 or the fourth inductor 36, a deviation between a current path length from the second feed 31 to the first radiator 10 and a current path length from the second feed 31 to the second radiator 20 may be adjusted, so that the two current path lengths are equal. The second feed network shown in FIG. 3 is merely an example, and may also include only a third inductor, or may include only another matching network such as a fourth inductor. In actual use, an inductor or a capacitor may be selected as required to form a required matching network.

Figure 4:
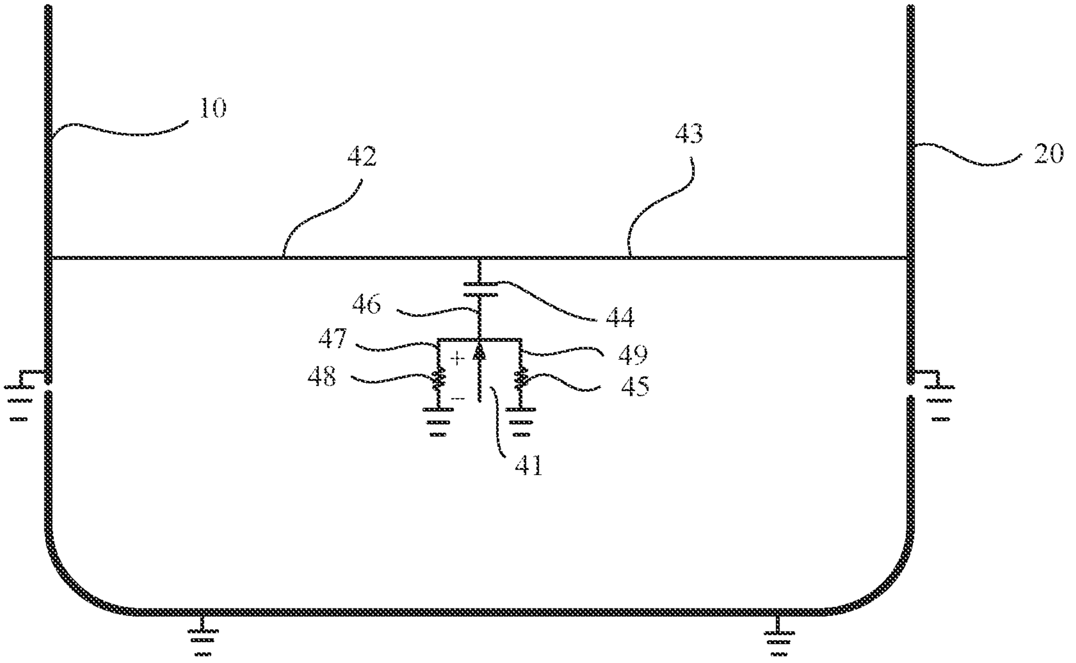
FIG. 4 shows a specific structural form of an antenna ant2.

FIG. 4 shows an example of a structure of an antenna ant2. The antenna ant2 includes the first radiator 10, the second radiator 20, and the first feed network 40. The first feed network 40 is a symmetric feed network, and includes a first feed 41, a first feed line 42, and a second feed line 43. In FIG. 4, the first feed line 41 and the second feed line 42 may be of an integrated structure. An end that is away from the second feed line 42 and that is of the first feed line 41 is connected to the first radiator 10, and an end that is away from the first feed line 41 and that is of the second feed line 42 is connected to the second radiator 20. The first feed line 42 and the second feed line 43 are symmetrically disposed, and have a same current path length. A first metal wire 46 is connected to a joint between the first feed line 41 and the second feed line 42, a positive electrode of the first feed 41 is connected to an end that is far away from the first feed line 42 and that is of the first metal wire 46, and a negative electrode of the first feed 41 is grounded. An end that is away from the first feed line 42 and that is of the first metal wire 46 is separately connected to a second metal wire 47 and a third metal wire 49. Ends that are away from the first metal wire 47 and that are of the second metal wire 47 and the third metal wire 49 are separately grounded.

Optionally, the symmetric feed network may further include a first matching network, and a current fed by the first feed 41 to the radiators (the first radiator 10 and the second radiator 20) may be adjusted through the first matching network. As shown in FIG. 4, the first matching network includes a first capacitor 44 disposed on the first metal wire 46, a first inductor 45 disposed on the third metal wire 49, and a second inductor 48 disposed on the second metal wire 47. A current fed by the first feed 41 to the radiator may be adjusted by adjusting a capacitance value of the first capacitor 44 and inductance values of the first inductor 45 and the second inductor 48. Certainly, it should be understood that the first matching network shown in FIG. 4 is merely a specific example, and the first matching network may select different capacitors or inductors as required to adjust the current fed by the first feed 41 to the radiator.

Figure 5:
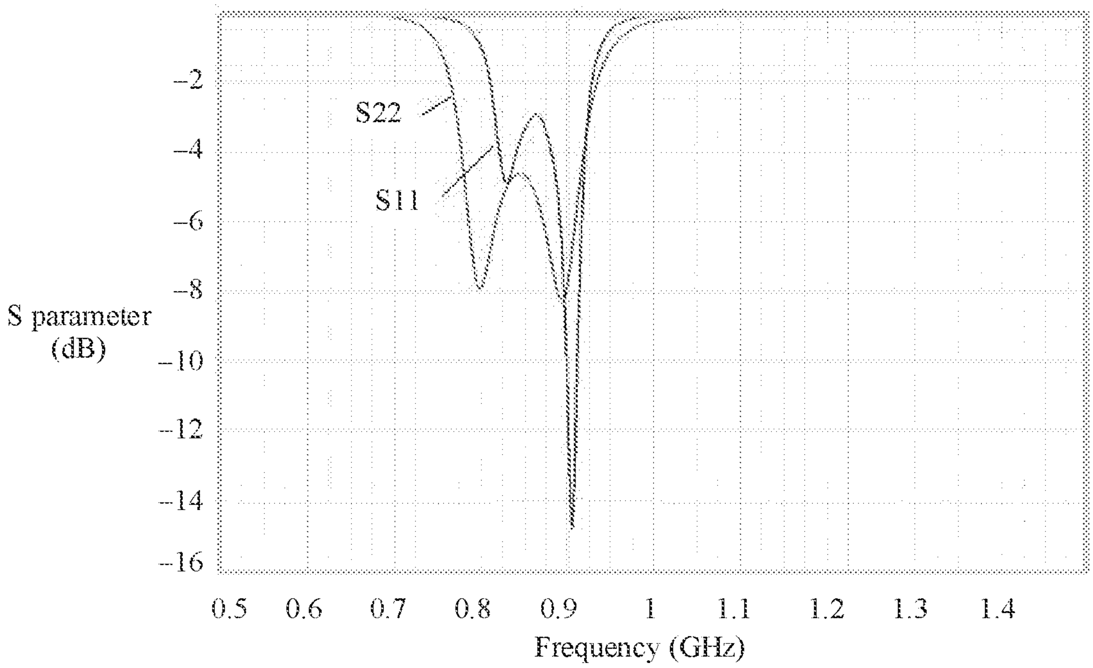
FIG. 5 shows a group of reflection coefficient curves of antennas ant1 and ant2 simulation.

To facilitate understanding of an isolation effect between the antenna ant1 and the antenna ant2, the following describes simulation of the antenna ant1 and the antenna ant2. FIG. 5 shows a group of reflection coefficient curves of antennas ant1 and ant2 simulation, where S11 is a reflection coefficient of the ant1 in an anti-symmetrical feeding mode, and S12 is a reflection coefficient of the ant2 in a symmetric feeding mode. The reflection curve of the ant1 includes two resonance modes with resonance frequencies of respectively around 0.82 GHz and 0.9 GHz. At the two resonance frequencies, directions of currents on radiators are opposite. The reflection curve of the ant2 also includes two resonance modes with resonance frequencies of respectively around 0.8 GHz and 0.89 GHz. At the two resonance frequencies, directions of currents on radiators are the same. The following provides a description with reference to current simulation diagrams of the two antennas.

Figure 6A:
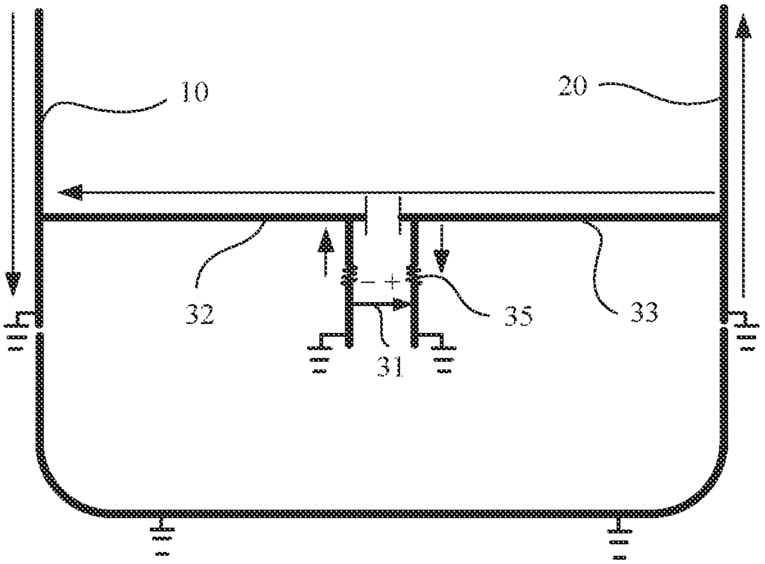
FIG. 6*a* shows current distribution of an antenna ant1 at 0.82 GHz.
Figure 6B:
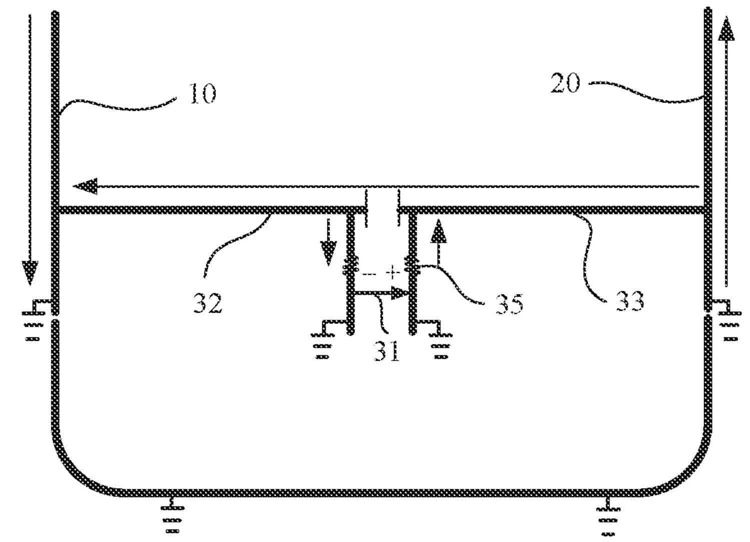
FIG. 6*b* shows current distribution of an antenna ant1 at 0.9 GHz.
Figure 6C:
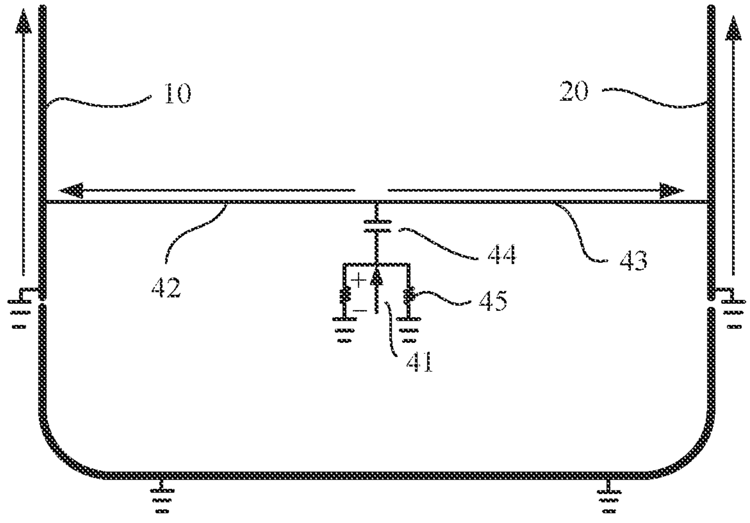
FIG. 6*c* shows current distribution of an antenna ant2 at 0.8 GHz.
Figure 6D:
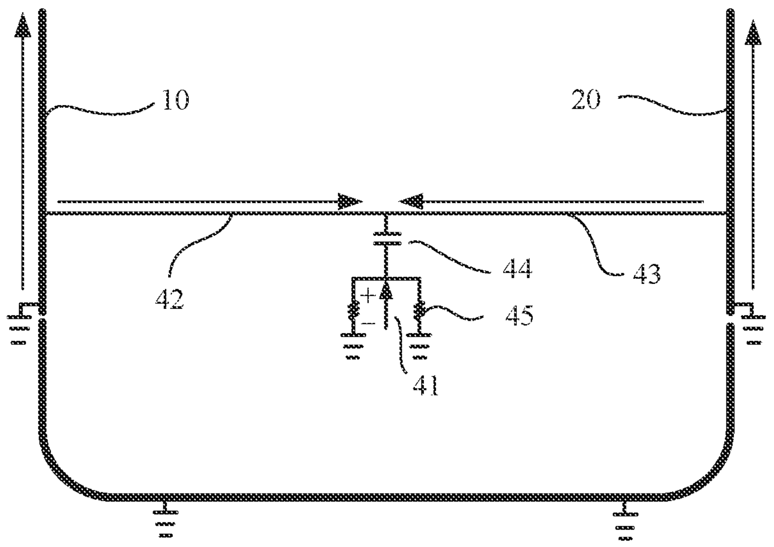
FIG. 6*d* shows current distribution of an antenna ant2 at 0.89 GHz.

FIG. 6*a* shows current distribution of an antenna ant1 at 0.82 GHz. A placement direction of the antenna ant1 shown in FIG. 6*a* is used as a reference direction. As shown by an arrow in FIG. 6*a*, a current flow direction on the first radiator 10 is from top to bottom and a current flow direction on the second radiator 10 is from bottom to top. The current directions on the first radiator 10 and the second radiator are opposite. FIG. 6*b* shows current distribution of an antenna ant1 at 0.9 GHz. A placement direction of the antenna ant1 shown in FIG. 6*h* is used as a reference direction. As shown by an arrow in FIG. 6*b*, a current flow direction on the first radiator 10 is from bottom to top, and a current flow direction on the second radiator 10 is from top to bottom. The current directions on the first radiator 10 and the second radiator are opposite. As shown in FIG. 6*c* and FIG. 6*d*, FIG. 6*c* shows current distribution of an antenna ant2 at 0.8 GHz. A placement direction of the antenna ant1 shown in FIG. 6*c* is used as a reference direction. As shown by an arrow in FIG. 6*c*, both a current on the first radiator 10 and a current on the second radiator 10 flow from bottom to top, and current directions on the first radiator 10 and the second radiator are the same. FIG. 6*d* shows current distribution of an antenna ant2 at 0.89 GHz. A placement direction of the antenna ant1 shown in FIG. 6*d* is used as a reference direction. As shown by an arrow in FIG. 6*d*, both a current on the first radiator 10 and a current on the second radiator 10 flow from top to bottom, and current directions on the first radiator 10 and the second radiator are the same. It can be seen from comparison between FIG. 6*a* and FIG. 6*c* and comparison between FIG. 6*b* and FIG. 6*d* that current directions on radiators of the antenna ant1 and the antenna ant2 are opposite. This effectively improves isolation between the antenna ant1 and the antenna ant2.

Figure 7A:
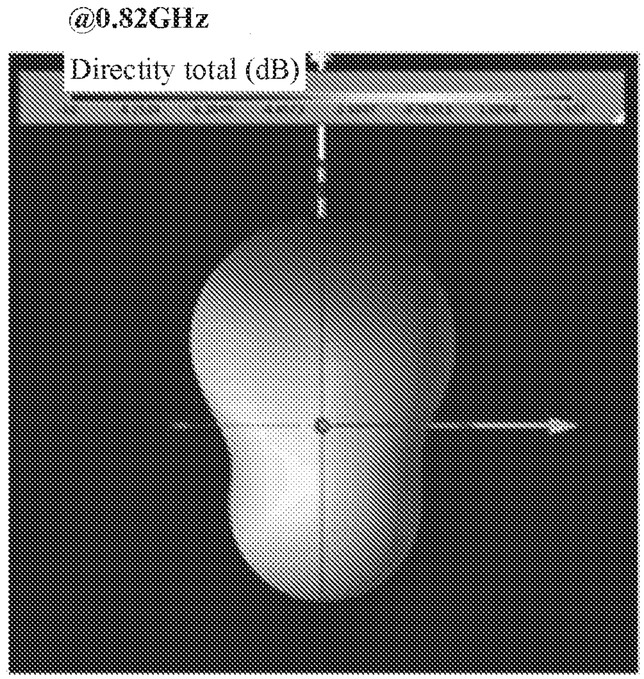
FIG. 7*a* shows a radiation pattern of an antenna ant1 at 0.82 GHz.
Figure 7B:
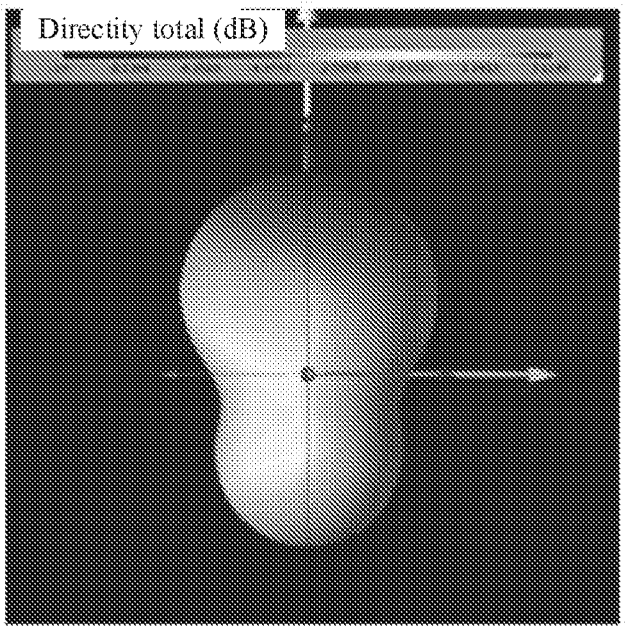
FIG. 7*b* shows a radiation pattern of an antenna ant1 at 0.9 GHz.
Figure 7C:
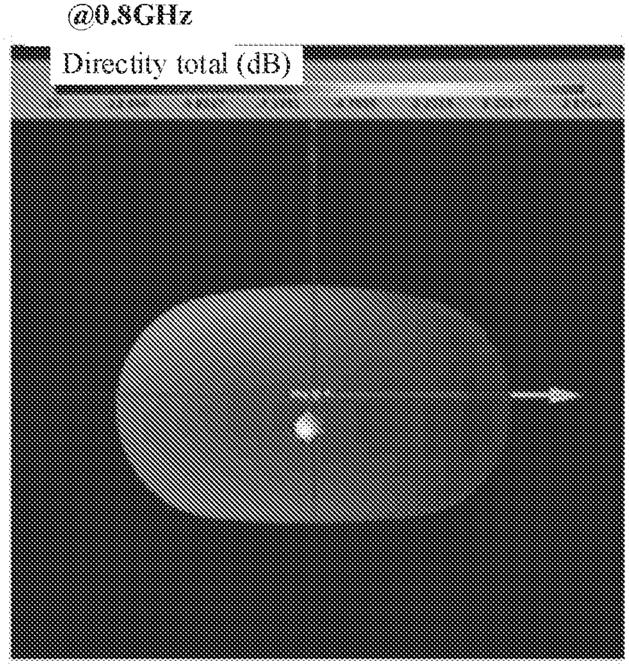
FIG. 7*c* shows a radiation pattern of an antenna ant2 at 0.8 GHz.
Figure 7D:
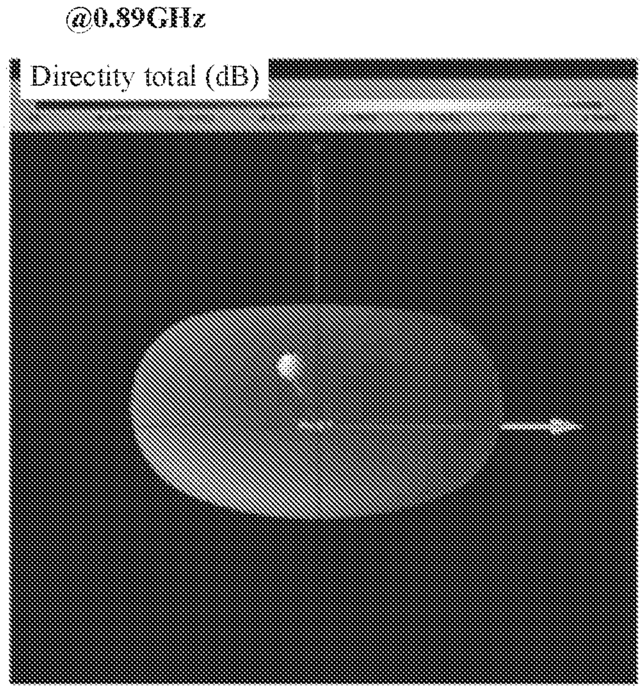
FIG. 7*d* shows a radiation pattern of an antenna ant2 at 0.89 GHz.

FIG. 7*a* shows a radiation pattern of an antenna ant1 at 0.82 GHz. A radiation direction of the antenna ant1 is a vertical direction. In an amplitude diagram, an area with a deep gray scale represents strong radiation, and a white area represents weak radiation. FIG. 7*b* shows a radiation pattern of an antenna ant1 at 0.7 GHz. A radiation direction of the antenna ant1 is a vertical direction. In an amplitude diagram, an area with a deep gray scale represents strong radiation, and a white area represents weak radiation. FIG. 7*c* shows a radiation pattern of an antenna ant2 at 0.8 GHz. A radiation direction of the antenna ant2 is a horizontal direction. In an amplitude diagram, an area with a deep gray scale represents strong radiation, and a white area represents weak radiation. FIG. 7*d* shows a radiation pattern of an antenna ant2 at 0.87 GHz. A radiation direction of the antenna ant2 is a horizontal direction. In an amplitude diagram, an area with a deep gray scale represents strong radiation, and a white area represents weak radiation. It can be seen from comparison between FIG. 7*a* and FIG. 7*c* and comparison between FIG. 7*b* and FIG. 7*d* that radiation directions of the antenna ant1 and the antenna ant2 are perpendicular. Therefore, there may be good isolation between the two antennas.

Figure 8:
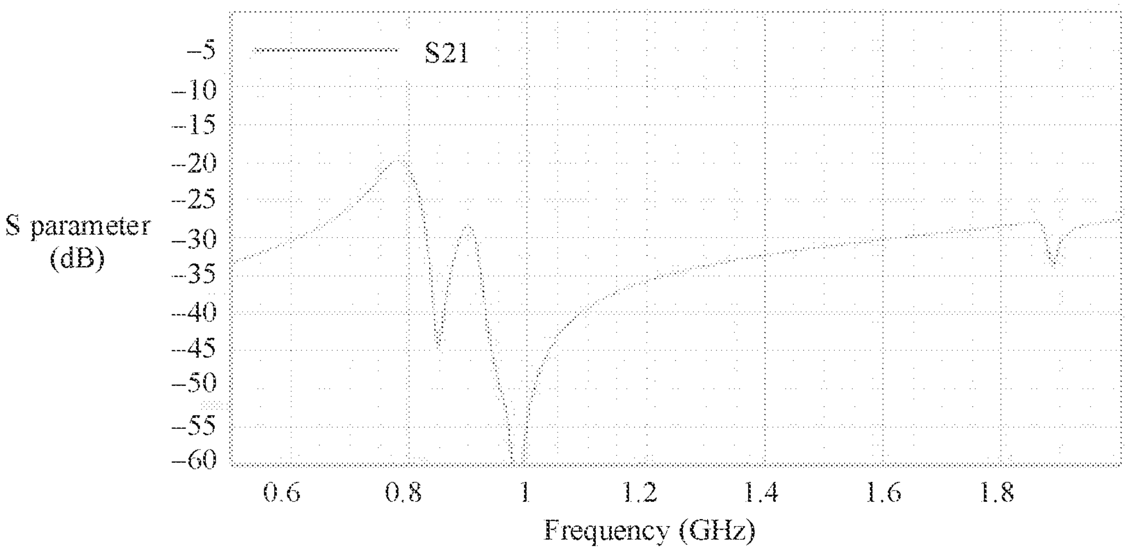
FIG. 8 shows a transmission coefficient between antennas ant1 and ant2.

For clearer understanding of performance between the antenna ant1 and the antenna ant2 provided in this embodiment of this application, FIG. 8 shows a transmission coefficient between the antenna ant1 and the antenna ant2, where S21 is a transmission coefficient between the antenna ant1 and the antenna ant2. It can be seen from FIG. 8 that a maximum transmission coefficient is −20 dB. Isolation between antennas is opposite to the transmission coefficient. Therefore, it can be learned from FIG. 8 that the isolation between the antenna ant1 and the antenna ant2 may reach more than 20 dB.

Figure 9:
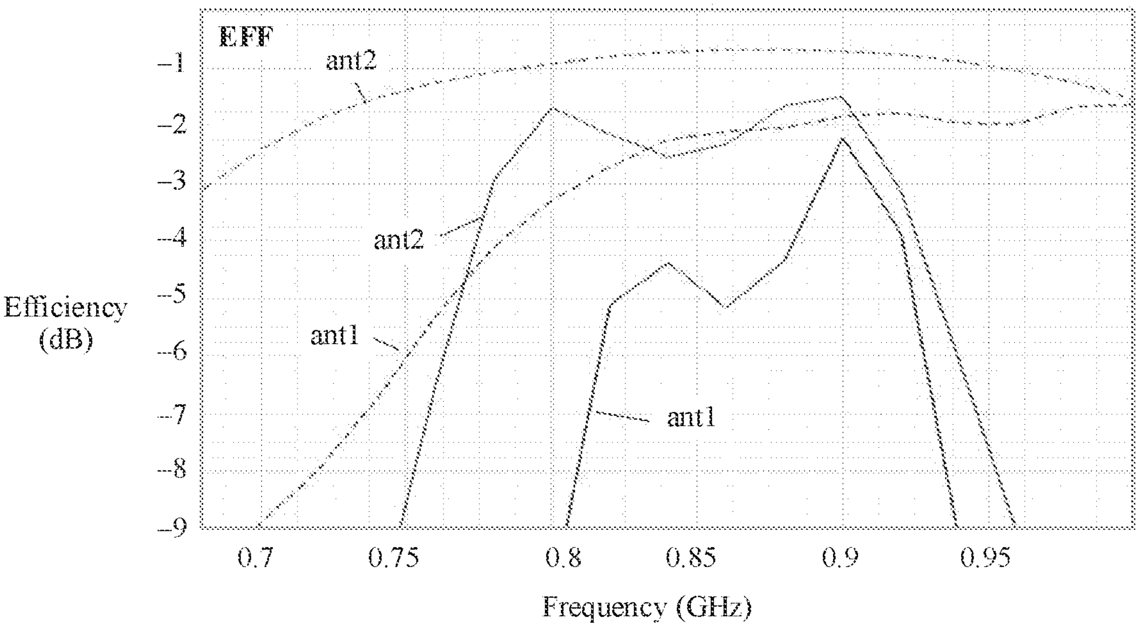
FIG. 9 shows efficiency curves of antennas ant1 and ant2.

FIG. 9 shows efficiency curves of an antenna ant1 and an antenna ant2. A solid line represents system efficiency, and a dashed line represents radiation efficiency. It can be seen from FIG. 9 that, when efficiency of the antenna ant1 is −5 dB, a corresponding frequency band bandwidth reaches over 100 MHz, and radiation efficiency is over −3 dB. When efficiency of the antenna ant2 is −4 dB, a corresponding frequency band bandwidth is 200 MHz, and radiation efficiency is − dB. It can be learned from FIG. 9 that frequency bands of the antenna ant1 and the antenna ant2 are both within a radiation frequency band.

It can be learned from the foregoing description that, in the antenna disclosed in this application, two radiators with a same electrical length are connected through the first feed network 40 and the second feed network 30. In this way, an antenna pair with high isolation can be formed. Performance of the two antennas is close, and the two antennas may be used in a MIMO or multi-CA antenna system. Particularly, performance of each of the two antennas in a symmetric structure is balanced, so that performance of the antenna pair is generally better than performance of a single radiator.

Figure 10:
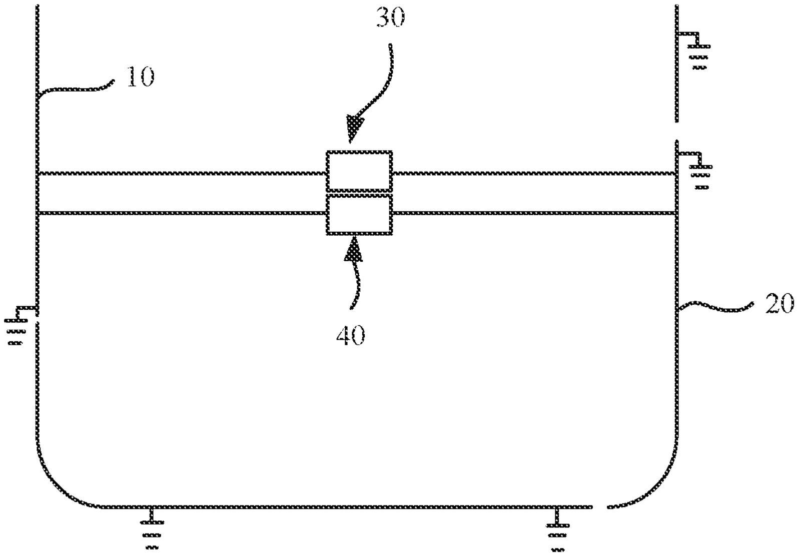
FIG. 10 shows a structure of another antenna according to an embodiment of this application.

FIG. 10 shows a structure of another antenna according to an embodiment of this application. The antenna shown in FIG. 10 is considered as a low-frequency antenna. A difference from the low-frequency antenna shown in FIG. 2 lies in that the first radiator 10 and the second radiator 20 of the low-frequency antenna shown in FIG. 10 are disposed in an asymmetric manner.

As shown in FIG. 10, the first radiator 10 and the second radiator 20 use an IFA structure in a form of a metal frame. The first radiator 10 is located at a middle upper part of a left bezel of a mobile phone (a placement direction of the mobile phone in FIG. 10 is used as a reference direction, and is close to a side bezel of an earpiece position of the mobile phone). A lower end of the first radiator 10 is grounded, and an upper end of the first radiator 10 is open. The second radiator 20 is disposed at a lower middle part of a right bezel of a mobile phone housing. An upper end of the second radiator 20 is grounded, and a lower end of the second radiator 20 is open. In addition, a current path length of the first radiator 10 is the same as or approximately the same as a current path length of the second radiator 20. A length of each radiator may be set according to a requirement. For example, the length of each radiator is approximately ¼ of a wavelength corresponding to an operating frequency band of the low-frequency antenna. For example, the length is corresponding to ⅙ to ⅓ of the wavelength corresponding to the operating frequency band of the low-frequency antenna, and may be specifically ⅙, ¼, ⅓, or the like of the wavelength. In addition, the first radiator 10 and the second radiator 20 provided in this embodiment of this application are not limited to a form of using the metal frame shown in FIG. 10, and may further use another form, for example, use another structure form such as a flexible circuit, a metal layer, or a printed circuit on a printed circuit board to form an IFA structure.

Figure 11:
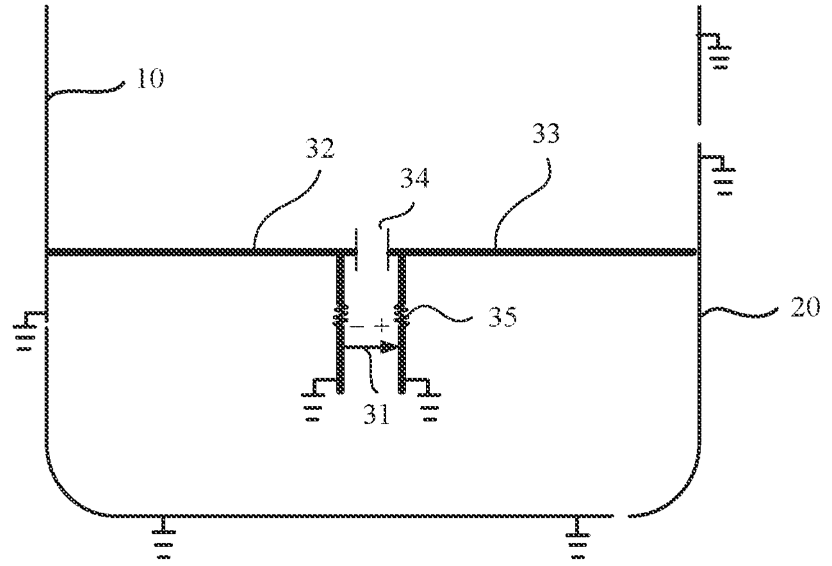
FIG. 11 shows another specific structural form of an antenna ant1.
Figure 12:
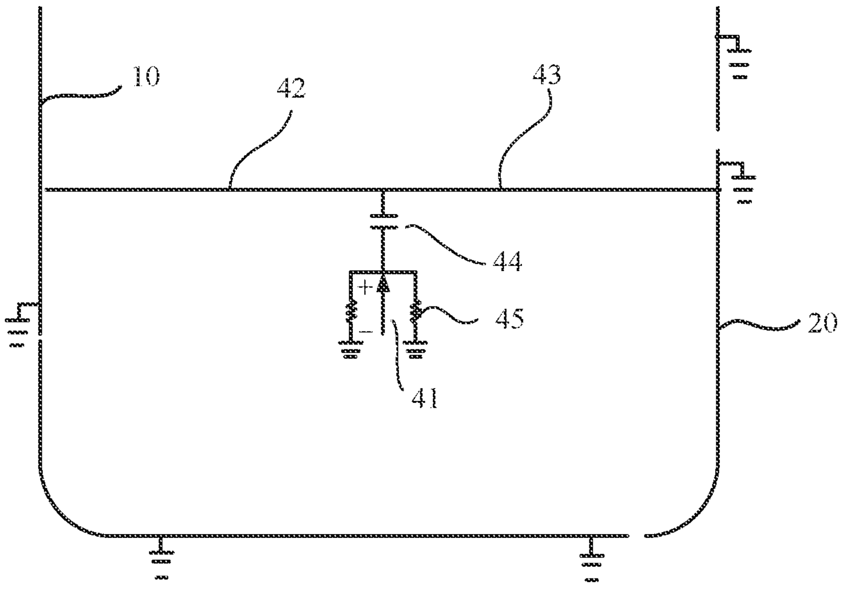
FIG. 12 shows another specific structural form of an antenna ant2.

Still refer to FIG. 10. The low-frequency antenna provided in this embodiment of this application further includes a feed network. The feed network in FIG. 10 includes two parts: a first feed network 40 and a second feed network 30. The low-frequency antenna shown in FIG. 10 includes two sub-antennas: an antenna ant1 shown in FIG. 11. The second feed network 30 is separately connected to the first radiator 10 and the second radiator 20. For a structure of the second feed network 30, refer to the related description in FIG. 4. For an antenna ant2 shown in FIG. 12, the first feed network 40 is separately connected to the first radiator 10 and the second radiator 20. For a structure of the first feed network 40, refer to the related description in FIG. 5.

Figure 13:
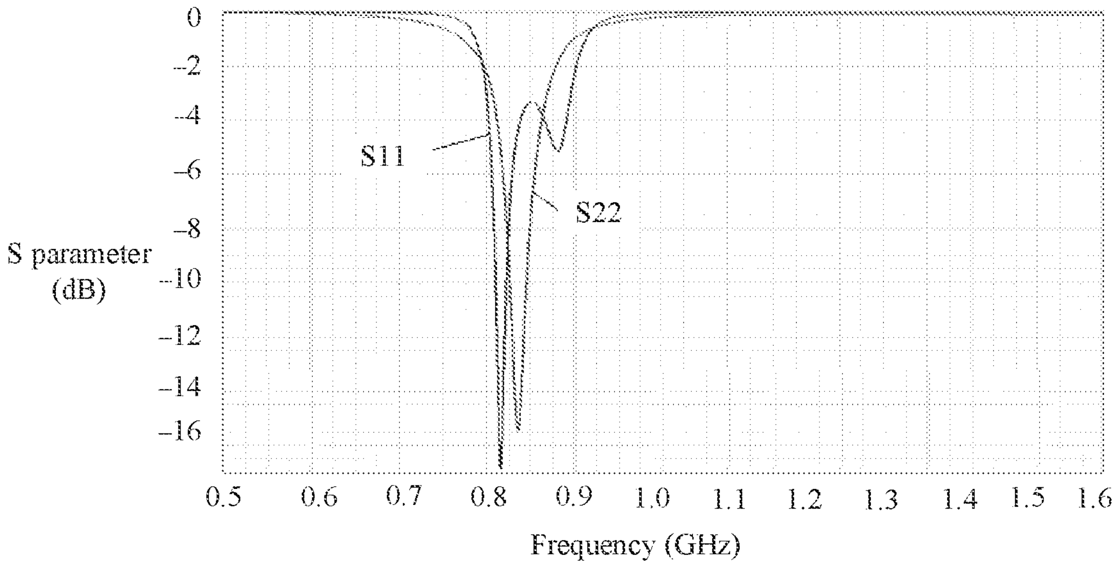
FIG. 13 shows another group of reflection coefficient curves of antennas ant1 and ant2 simulation.

For ease of understanding, the antenna ant1 and the antenna ant2 are simulated. FIG. 13 shows another group of reflection coefficient curves of antenna simulation. S11 is a reflection coefficient of the antenna ant1 in an anti-symmetrical feeding mode, and S22 is a reflection coefficient of the antenna ant2 in a symmetric feeding mode. A reflection curve of the ant1 includes two resonance modes with resonance frequencies of respectively around 0.82 GHz and 0.88 GHz. At the two resonance frequencies, directions of currents on radiators are the same. A reflection curve of the antenna ant2 includes only one resonance mode with a resonance frequency of around 0.84 GHz. At this resonance frequency, directions of currents on radiators are opposite. The following provides a description with reference to current simulation diagrams of the two antennas.

Figure 14A:
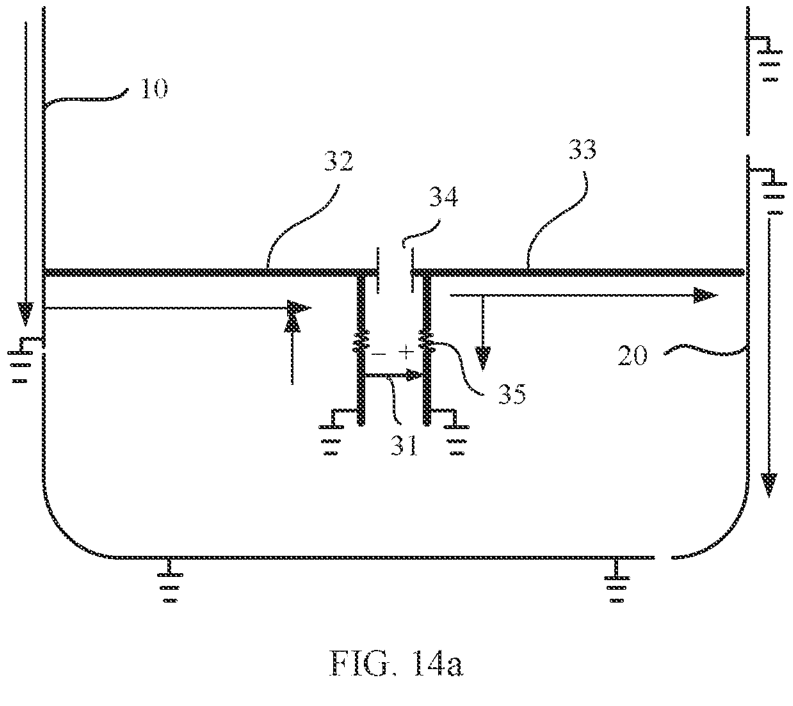
FIG. 14*a* shows another current distribution of an antenna ant1 at 0.82 GHz.
Figure 14B:
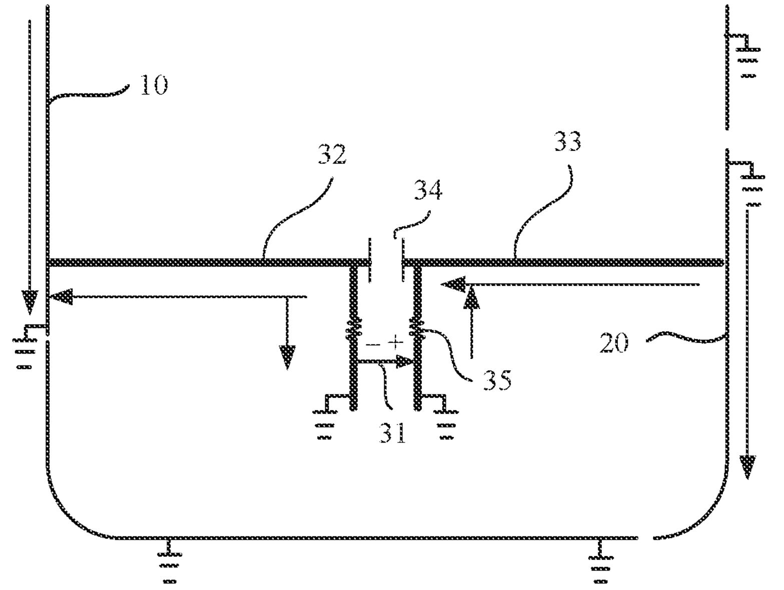
FIG. 14*b* shows current distribution of an antenna ant1 at 0.88 GHz.
Figure 14C:
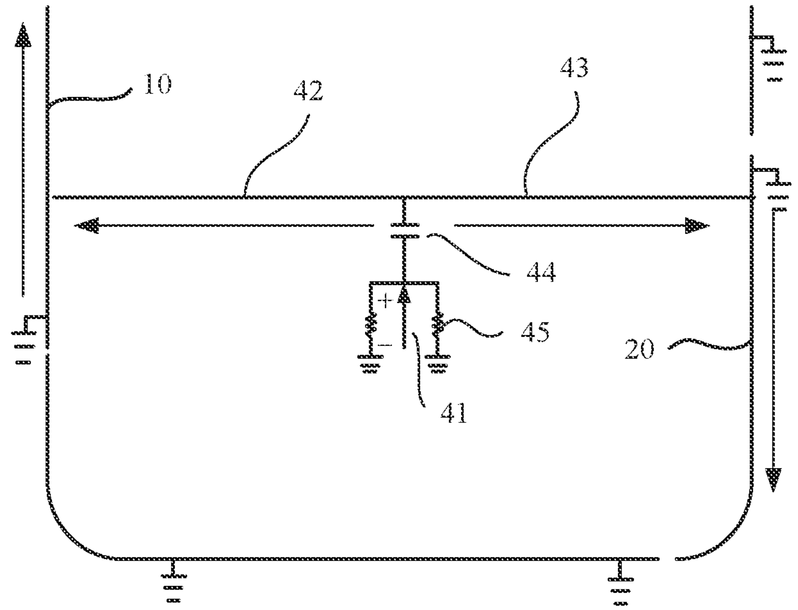
FIG. 14*c* shows current distribution of an antenna ant2 at 0.84 GHz.

FIG. 14*a* shows current distribution of an antenna ant1 at 0.82 GHz. In a direction shown by an arrow in FIG. 14*a*, currents on the first radiator 10 and the second radiator 20 flow from an upper end to a lower end of the respective radiator (the placement direction of the antenna shown in FIG. 14*a* is used as a reference direction). Therefore, the flow directions of the currents on the first radiator 10 and the second radiator 20 are the same. FIG. 14*b* shows current distribution of an antenna ant1 at 0.88 GHz. In a direction shown by an arrow in FIG. 14*b*, currents on the first radiator 10 and the second radiator 20 flow from an upper end to a lower end of the respective radiator (the placement direction of the antenna shown in FIG. 14*a* is used as a reference direction). Therefore, the flow directions of the currents on the first radiator 10 and the second radiator 20 are the same. FIG. 14*c* shows current distribution of an antenna ant2 at 0.84 GHz. In a direction shown by an arrow in FIG. 14*c*, current on the first radiator 10 flows from a lower end to an upper end of the first radiator 10, and current on the second radiator 20 flows from the upper end to the lower end of the first radiator 10. Therefore, the flow direction of the current on the first radiator 10 is opposite to the flow direction of the current on the second radiator 20. It can be seen from comparison between FIG. 14*a* and FIG. 14*c* and comparison between FIG. 14*b* and FIG. 14*c* that, a current on a radiator of the antenna ant1 is at least partially reverse to a current on a radiator of the antenna ant2. This effectively improves isolation between the two antennas.

Figure 15A:
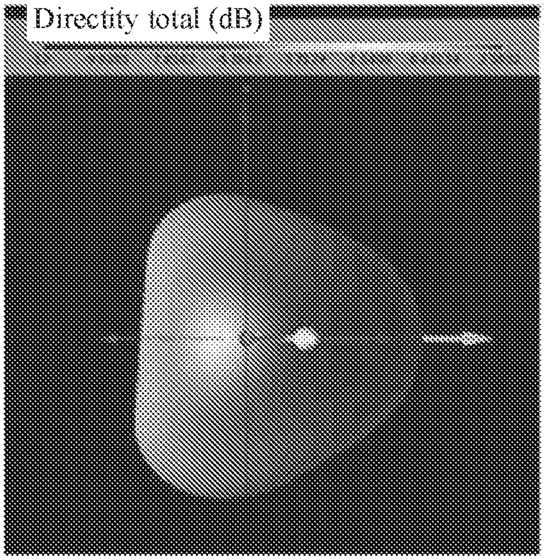
FIG. 15*a* shows another radiation pattern of an antenna ant1 at 0.82 GHz.
Figure 15B:
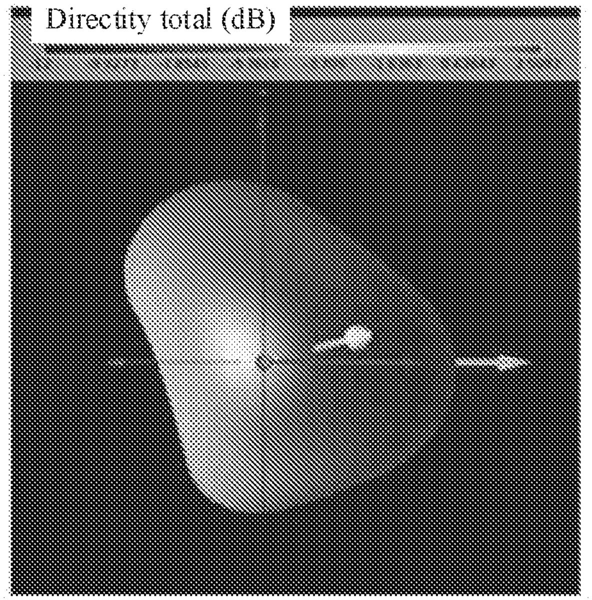
FIG. 15*b* shows a radiation pattern of an antenna ant1 at 0.88 GHz.
Figure 15C:
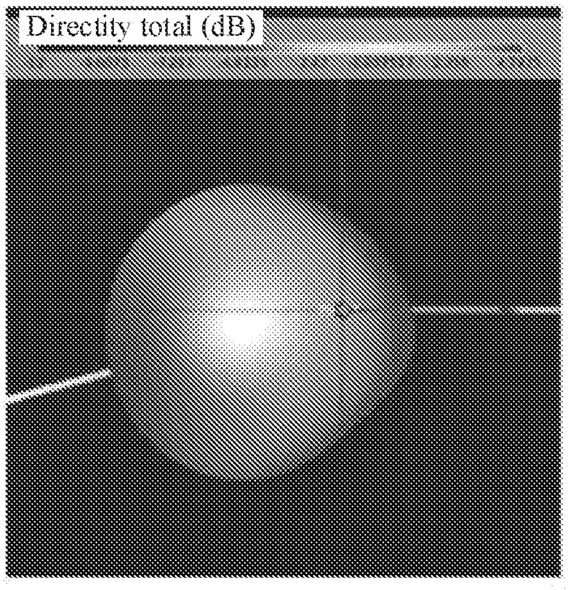
FIG. 15*c* shows a radiation pattern of an antenna ant2 at 0.84 GHz.

FIG. 15*a* shows a radiation pattern of an antenna ant1 at 0.82 GHz, where an area with a deep gray scale in an amplitude diagram represents strong radiation, and a white area in the amplitude diagram represents weak radiation. FIG. 15*b* shows a radiation pattern of an antenna ant1 at 0.88 GHz, where an area with a deep gray scale in an amplitude diagram represents strong radiation, and a white area in the amplitude diagram represents weak radiation. FIG. 15*c* shows a radiation pattern of an antenna ant2 at 0.84 GHz. In an amplitude diagram, an area with a deep gray scale represents strong radiation, and a white area represents weak radiation.

Figure 16:
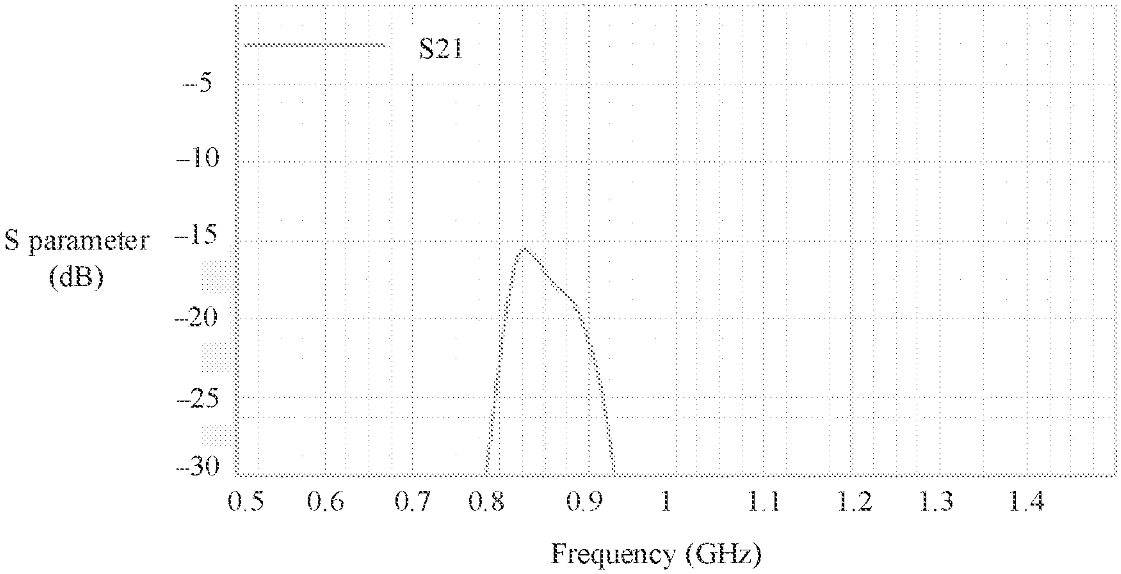
FIG. 16 shows another transmission coefficient between antennas ant1 and ant2.

For clearer understanding of performance between the antenna ant1 and the antenna ant2 provided in this embodiment of this application, FIG. 16 shows a transmission coefficient between the antenna ant1 and the antenna ant2, where S21 is a transmission coefficient between the antenna ant1 and the antenna ant2. It can be seen from FIG. 16 that a maximum transmission coefficient is −15. Isolation between antennas is opposite to the transmission coefficient. Therefore, it can be learned from FIG. 16 that the isolation between the antenna ant1 and the antenna ant2 may reach more than 15 dB.

Figure 17:
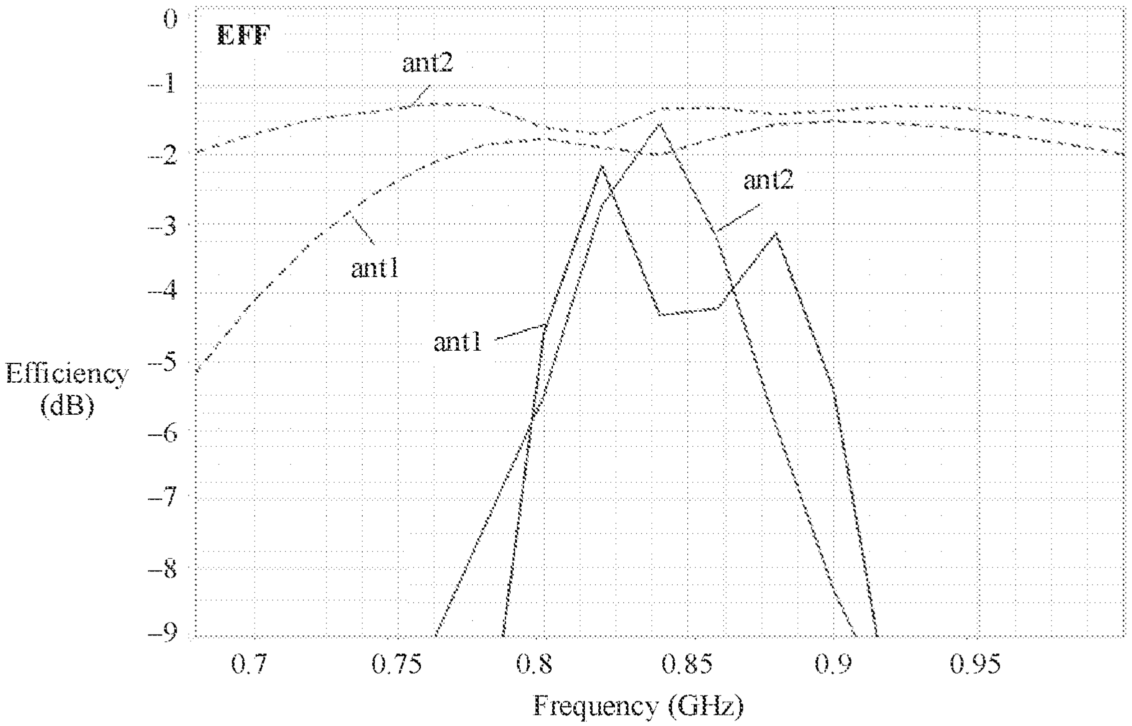
FIG. 17 shows other efficiency curves of antennas ant1 and ant2.

FIG. 17 shows efficiency curves of two antennas. A solid line represents system efficiency, and a dashed line represents radiation efficiency. When efficiency of an antenna ant1 is −5 dB, a corresponding frequency band bandwidth may reach over 100 MHz, and radiation efficiency may be over −3 dB. When efficiency of an antenna ant2 is −5 dB, a corresponding frequency band bandwidth is 70 MHz, and radiation efficiency is −2 dB. It can be seen from FIG. 17 that frequency bands of the antenna ant1 and the antenna ant2 are both within a radiation frequency band.

Figure 18:
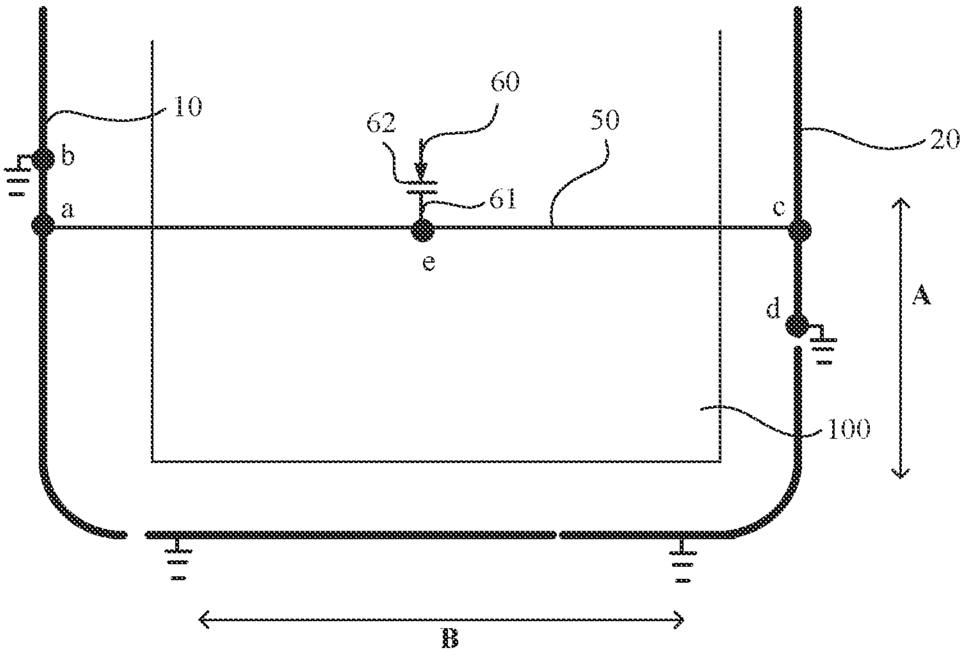
FIG. 18 shows a single-feed antenna according to this application.

As shown in FIG. 18, an embodiment of this application further provides a single-feed antenna, which is also a low-frequency antenna. FIG. 18 includes a first radiator 10, a second radiator 20, and a feed 60. The first radiator 10 has a first feed point a and a first ground point b. The second radiator 20 has a second feed point c and a second ground point d. In addition, the antenna further includes a connection line. The connection line has a first end and a second end that are opposite to each other. The first end is connected to the first feed point a of the first radiator 10, and the second end is connected to the second feed point c of the second radiator 20. A feeding point e is disposed on the connection line, and the feeding point e is connected to the feed 60. There is no other direct electrical connection between the first radiator 10 and the second radiator 20 except the connection line. Still refer to FIG. 18. Both ends of the first radiator 10 are open ends, and the ground point of the first radiator 10 is located between the two open ends. The second ground point of the second radiator 20 is located at one end of the second radiator 20, and the other end of the second radiator 20 is an open end. As shown in FIG. 18, when a terminal has a metal frame, the metal frame is provided with a plurality of openings, and the plurality of openings divide the metal frame into a plurality of metal segments. For ease of description, a long side wall and an end side wall of the metal frame are defined. For example, in FIG. 18, a length direction of a long metal side wall is shown in a direction of a straight line A, and a direction of a short side wall is shown in a direction of a straight line B. It should be understood that the metal frame has two opposite long side walls and two opposite short side walls, FIG. 18 shows only a part of the metal frame as an example.

When the terminal uses the metal frame, the first radiator 10 and the second radiator 20 are two different metal segments of the metal frame. As shown in FIG. 18, the first radiator 10 is a part of one long side wall, and the second radiator 20 is a part of the other long side wall. In addition, the second ground point d of the second radiator 20 is close to an open end of the first radiator 10. In FIG. 18, a ratio of a current path length of the first radiator 10 to a current path length of the second radiator 20 is greater than 2. For example, the current path length of the first radiator 10 is a metal segment of about ½ wavelength (a wavelength corresponding to an operating frequency band of the antenna). For example, the current path length of the first radiator 10 ranges from a ¼ wavelength to a ¾ wavelength, for example, is a ¼ wavelength, ½ wavelength, or ¾ wavelength. The first ground point b of the first radiator 10 is located in the middle, and two ends of the first radiator 10 are open. The first radiator 10 is similar to a radiator structure of a T antenna. The current path length of the second radiator 20 is about a ¼ wavelength (a wavelength corresponding to an operating frequency band of the antenna) of the metal frame. For example, the current path length of the second radiator 20 is between a ⅛ wavelength and a ½ wavelength, for example, ⅛ wavelength, ¼ wavelength, or ½ wavelength. The second ground point d of the second radiator 20 is located at a lower end of the second radiator 20, an upper end of the second radiator 20 is open, and the second radiator 20 may be similar to a radiator structure of an IFA antenna.

In an alternative solution, the first radiator 10 and the second radiator 20 may also be disposed in another manner. For example, the first radiator 10 includes a part of one long side wall and a part of one short side wall. The second radiator 20 includes a part of the other long side wall and a part of one short side wall. In this case, a current path length of the first radiator 10 and a current path length of the second radiator 20 are both a ½ wavelength. In another alternative solution, the metal frame has two opposite long side walls and two opposite short side walls. The first radiator 10 is a part of one long side wall, and the second radiator 20 is a part of the other long side wall. When a distance between the radiators is increased, the current path length of the first radiator 10 and the current path length of the second radiator 20 are about ¼ wavelength. It should be understood that, regardless of which manner is used by the first radiator 10 and the second radiator 20, the first end and the second end of the connection line are connected to the two long side walls in a one-to-one correspondence.

Still refer to FIG. 18. The antenna further includes a first feed network, a negative electrode of the feed 60 is grounded, and a positive electrode of the feed 60 is connected to the feeding point e through the first feed network. The feeding point e is connected to a first metal wire 61. The positive electrode of the feed 60 is connected to an end that is far away from the feeding point e and that is of the first metal wire 61. The first feed network includes a first capacitor 62 disposed on the first metal wire 61. It should be understood that the first feed network shown in FIG. 18 is merely an example. The feed network provided in this embodiment of this application may further include another structure. For example, when an end that is far away from the feeding point e and that is of the first metal wire 61 is further connected to a second metal wire and a third metal wire, and ends that are far away from the first metal wire 61 and that are of the second metal wire and the third metal wire are separately grounded, in addition to the first capacitor 62 included in FIG. 18, the first feed network further includes a first inductor disposed on the third metal wire and a second inductor disposed on the second metal wire. It should be understood that, in FIG. 18, although the feed 60 is disposed at a middle position in a mobile phone, a specific position of the feed 60 is not limited in this application.

When the feed 60 and a connection line 50 are specifically disposed, the terminal has a circuit board, and the feed 60 is disposed on the circuit board. The circuit board may be a PCB hoard 100, and the connection line 50 may be a metal wire on the PCB board. In a length direction of the short side wall, a first end and a second end of the connection line 50 cross a gap between the circuit hoard and the metal frame, and are connected to the two long sidewalls of the metal frame, that is, connected to parts that are of the first radiator 10 and the second radiator 20 and that are located on the long side walls of the metal frame. This implements connection between the connection line 50 and the radiator. During specific crossing, the connection line 50 on the PCB board 100 may be connected to the first radiator 10 and the second radiator 20 by using a metal wire or a metal layer.

Figure 19:
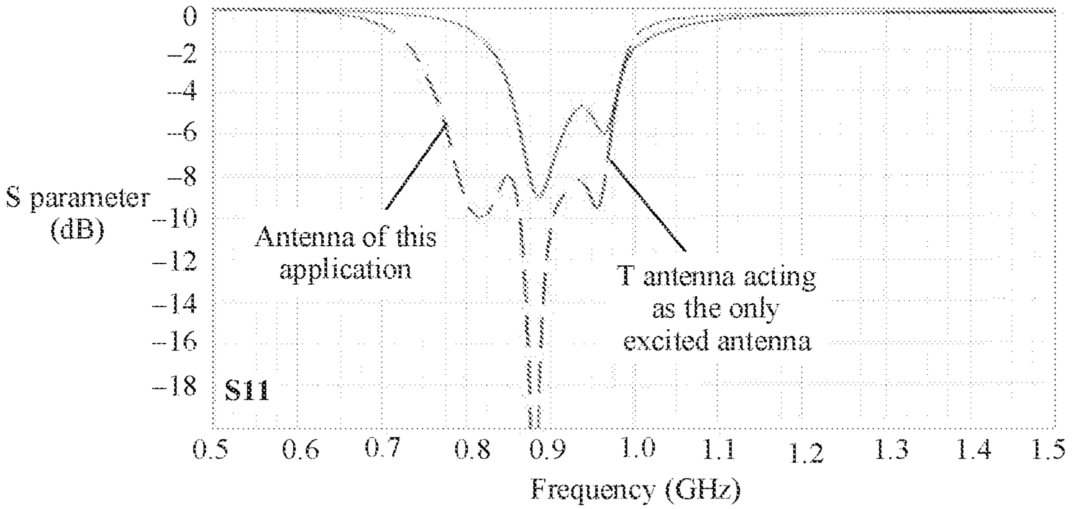
FIG. 19 shows a group of reflection coefficient curves of the antenna simulation.
Figure 20:
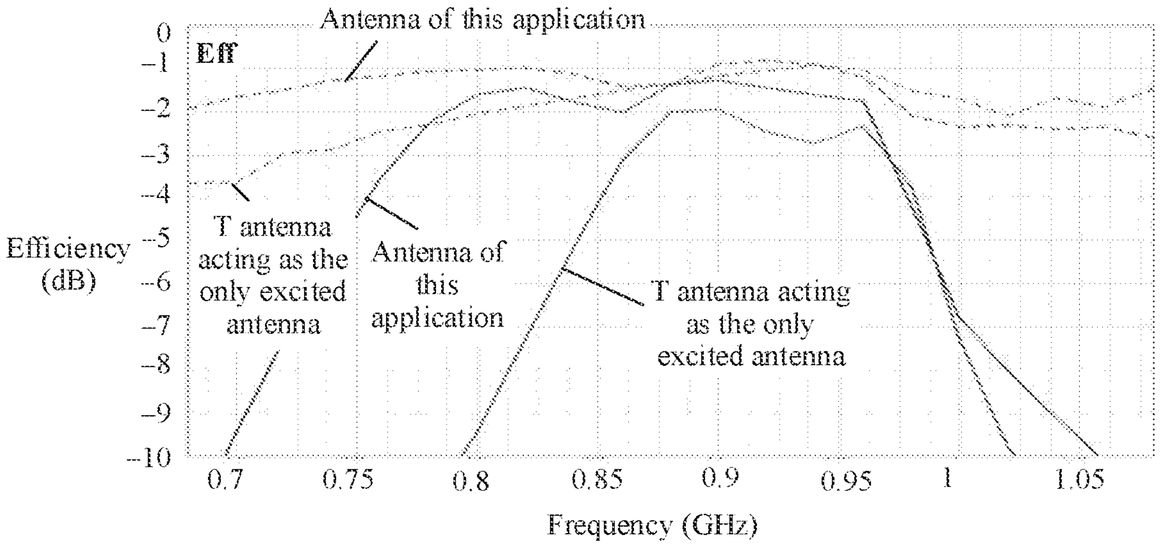
FIG. 20 shows an efficiency comparison between the antenna shown in FIG. 18 and a T antenna acting as the only excited antenna.

For ease of understanding of performance of the antenna in FIG. 18, simulation is performed on the antenna. FIG. 19 shows a group of reflection coefficient curves of the antenna simulation shown in FIG. 18, including three resonance modes with resonance frequencies of respectively around 0.82 GHz, 0.88 GHz, and 0.96 GHz. For comparison, a case in which only a left T antenna is excited is also simulated, and only common mode resonance and differential mode resonance are generated. The left T antenna greatly differs from a wideband multi-mode structure provided in this embodiment of this application in performance. FIG. 20 shows efficiency comparison between the two types of antennas. A solid line represents system efficiency, and a dashed line represents radiation efficiency. It can be learned from FIG. 20 that, in this application, when efficiency is −5 dB, a corresponding frequency band is 300 MHz, and radiation efficiency is over −2 dB. When efficiency of the left T antenna is −5 dB, a corresponding frequency band bandwidth is 200 MHz, and radiation efficiency is −3 dB. Therefore, the antenna shown in FIG. 18 has a large bandwidth.

Figure 21A:
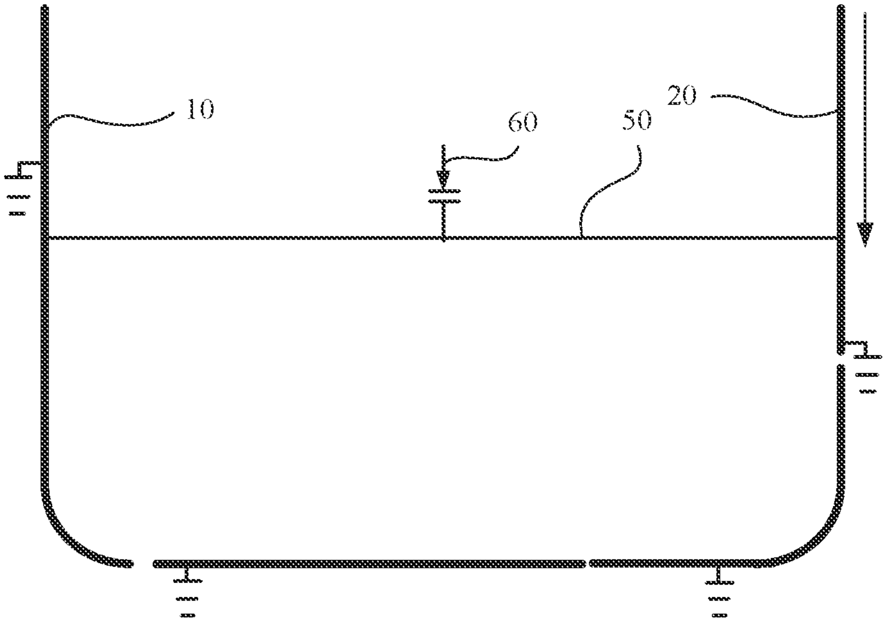
FIG. 21*a* shows that a current of an antenna in a 0.82 GHz frequency band flows on a second radiator.
Figure 21B:
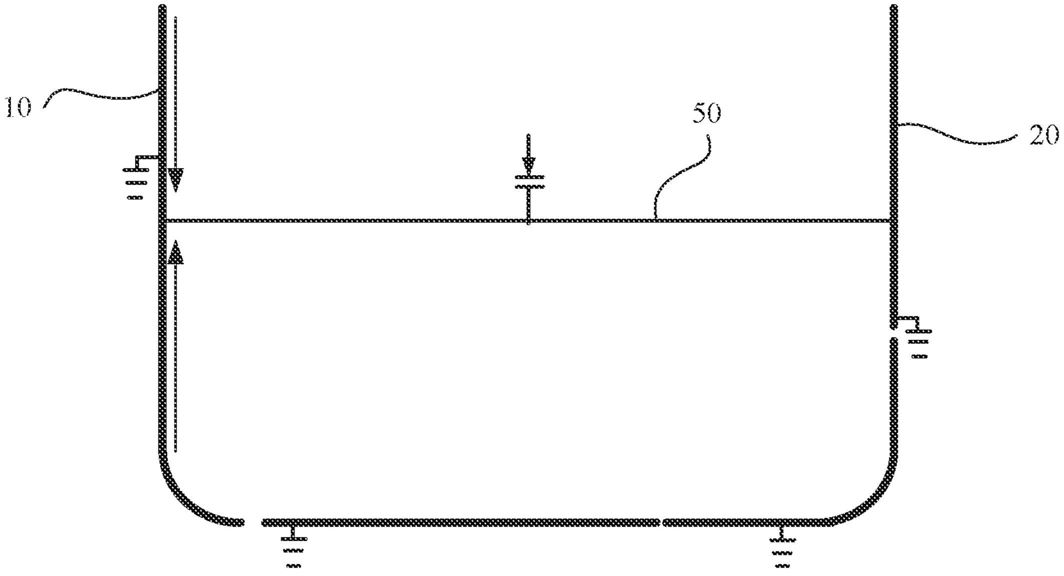
FIG. 21*b* shows that a current of an antenna in a 0.88 GHz frequency band flows on a first radiator.
Figure 21C:
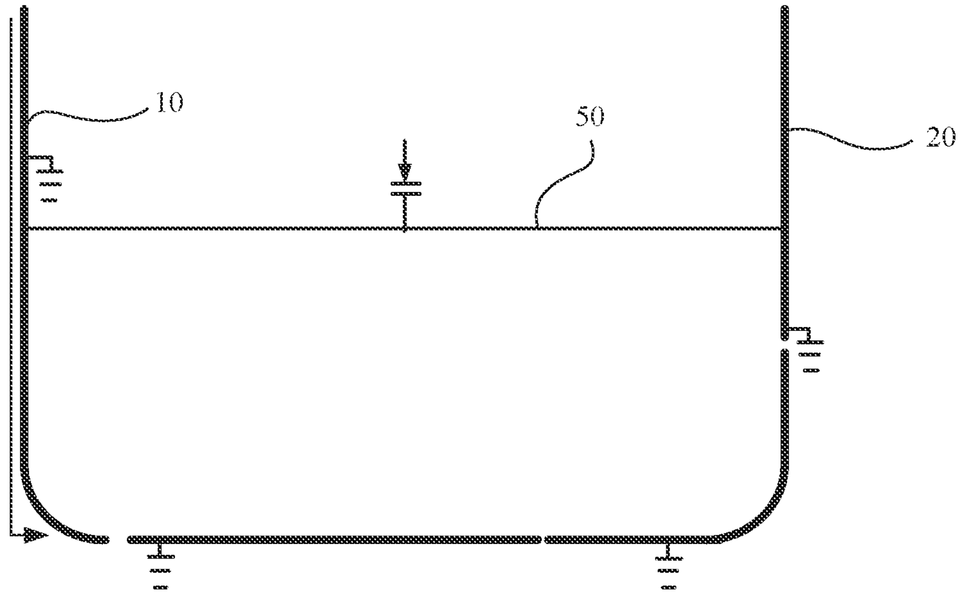
FIG. 21*c* shows that a current of an antenna in a 0.96 GHz frequency band flows on a first radiator.
Figure 22A:
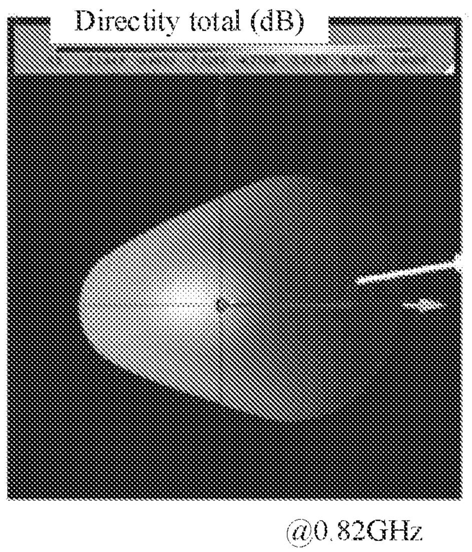
FIG. 22*a* shows a radiation direction of an antenna in a 0.82 GHz frequency band.
Figure 22B:
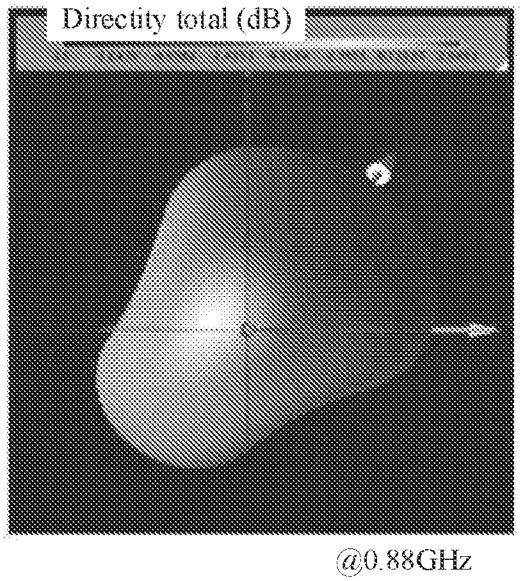
FIG. 22*b* shows a radiation direction of an antenna in a 0.88 GHz frequency band.
Figure 22C:
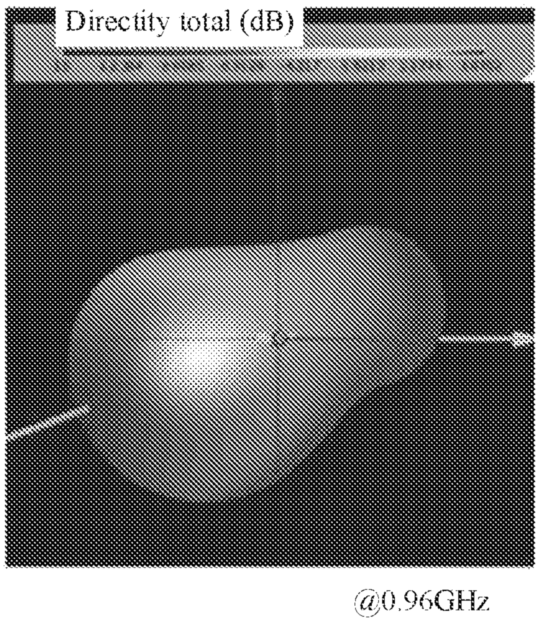
FIG. 22*c* shows a radiation direction of an antenna in a 0.96 GHz frequency band.

Refer to the three frequency bands in this application shown in FIG. 19. The 0.82 GHz resonance is mainly generated by a right IFA antenna, and current distribution of the 0.82 GHz resonance is shown in FIG. 21*a*. That a current of the antenna in a 0.82 GHz frequency band flows on the second radiator 20 is that the current flows from an upper end to a lower end of the second radiator 20. The 0.88 GHz resonance is a common mode generated by the left T antenna, and a corresponding current flow direction is shown in FIG. 21*b*: A current flows from two ends of the first radiator 10 to a joint between the first feed line 42 and the first radiator 10. The 0.96 GHz resonance is a differential mode generated by the left T antenna. A current flow direction corresponding to the 0.96 GHz resonance is shown in FIG. 21*c*: A current flows from an upper end to a lower end of the first radiator 10. Radiation patterns corresponding to the three resonance frequencies: FIG. 22*a* shows a radiation direction of an antenna in a 0.82 GHz frequency band. FIG. 22*b* shows a radiation direction of an antenna in a 0.88 GHz frequency band. FIG. 22*c* shows a radiation direction of an antenna in a 0.96 GHz frequency hand. In FIG. 22*a*, FIG. 22*b*, and FIG. 22*c*, an area with a deep gray scale in an amplitude diagram represents strong radiation, and a white area represents weak radiation. It can be learned from FIG. 22*a*, FIG. 22*b*, and FIG. 22*c* that the grayscale occupies most areas in the radiation pattern, and the antenna in this application has a good radiation effect at three resonance frequencies.

It can be learned from the foregoing description that, in the antenna provided in this application, two radiators with different current path lengths are connected through the first feed network, so that a single-feed wideband or multi-frequency antenna structure can be generally formed. This greatly improves free space or head-hand performance of the antenna. The single-feed antenna has a large aperture and is generally of a low SAR structure. Certainly, a second feed network may alternatively be used in the antenna shown in FIG. 18 to feed power. Therefore, the same effect can be achieved in this way.

Figure 23:
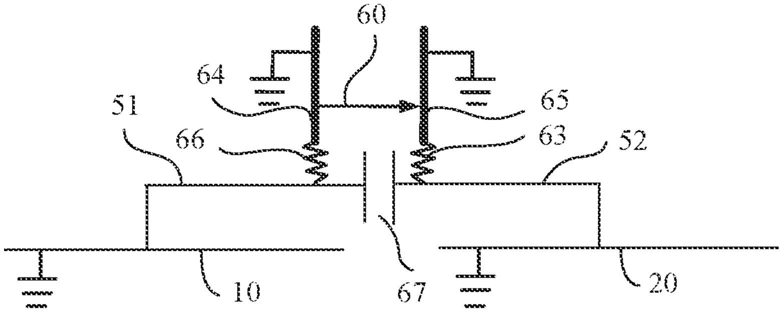
FIG. 23 shows an e-single-feed antenna according to an embodiment of this application.

FIG. 23 shows another example of a single-feed antenna. The antenna in FIG. 23 is a medium-high frequency antenna, and has two IFA radiators (the first radiator 10 and the second radiator 20) with different lengths. Both the first radiator 10 and the second radiator 20 are disposed at the bottom of a terminal. A short side wall of a metal frame is used as the radiator. Both the first radiator 10 and the second radiator 20 are grounded on the left side and open on the right side, and there is a specific distance between the first radiator 10 and the antenna of the second radiator 20. The two radiators are fed through the second feed network 30, to form a single-feed wideband antenna. In FIG. 23, a connection line includes a first connection line 51 and a second connection line 52. The first connection line 51 is connected to the first radiator 10, and the second connection line 52 is connected to the second radiator 20. A connection "bridge" structure is formed between the second teed network 30 and the two radiators by using the first connection line 51 and the second connection line 52. An end that is far away from the first radiator 10 and that is of the first connection line 51 is connected to a fourth metal wire 64, and an end that is far away from the first connection line 51 and that is of the fourth metal wire 64 is grounded. An end that is far away from the second radiator 20 and that is of the second connection line 52 is connected to a fifth metal wire 65, and an end that is far away from the second connection line 52 and that is of the fifth metal wire 65 is grounded. A positive electrode of the feed 60 is connected to the fifth metal wire 65, and a negative electrode of the feed 60 is connected to the fourth metal wire 64. The first connection line 51 and the second connection line 52 may be disposed in a symmetric manner, or may be disposed in an asymmetric manner. The fourth metal wire 64 and the fifth metal wire 65 are also disposed in a symmetric manner, or may be disposed in an asymmetric manner.

In an optional solution, the antenna further includes a second matching network. The second matching network includes a third inductor 63, a fourth inductor 66, and a second capacitor 67. The third inductor 63 is disposed on the fifth metal wire 65, the fourth inductor 66 is disposed on the fourth metal wire 64, and the second capacitor 67 is disposed between the first connection line 51 and the second connection line 52. This improves performance of the antenna. By adjusting an inductance value of the third inductor 63 or the fourth inductor 66, a deviation between a current path length from the feed to the first radiator 10 and a current path length from the feed to the second radiator 20 may be adjusted, so that the two current path lengths are equal. The second feed network shown in FIG. 23 is merely an example, and may also include only a third inductor, or may include only another matching network such as a fourth inductor. In actual use, an inductor or a capacitor may be selected as required to form a required matching network.

Figure 24:
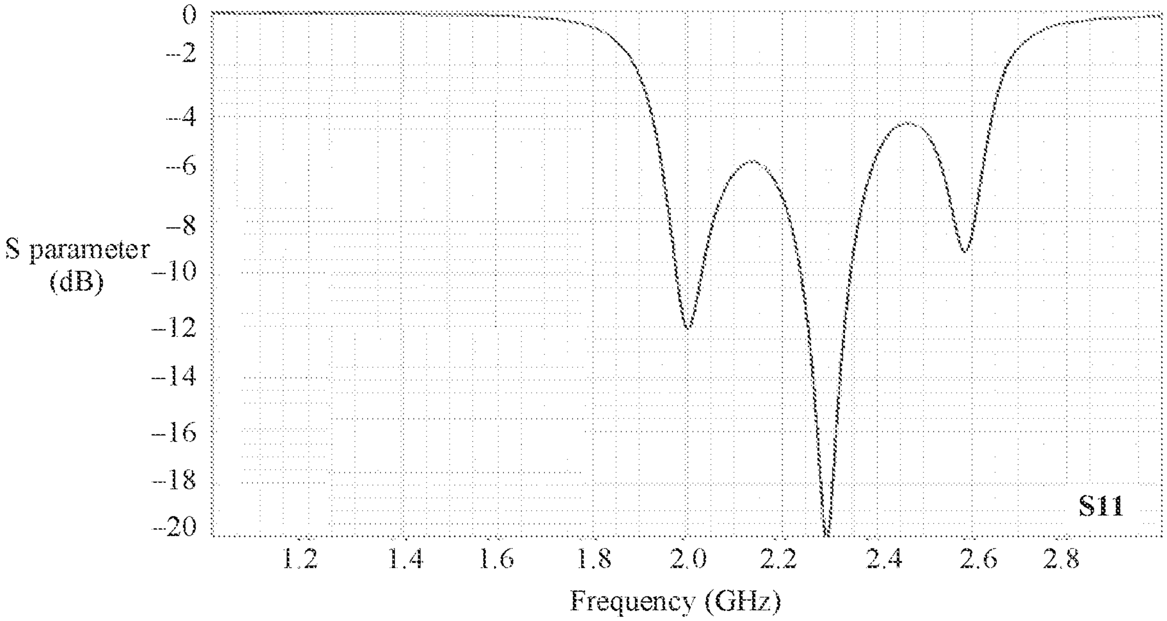
FIG. 24 shows reflection coefficient curves of the antenna simulation.
Figure 25:
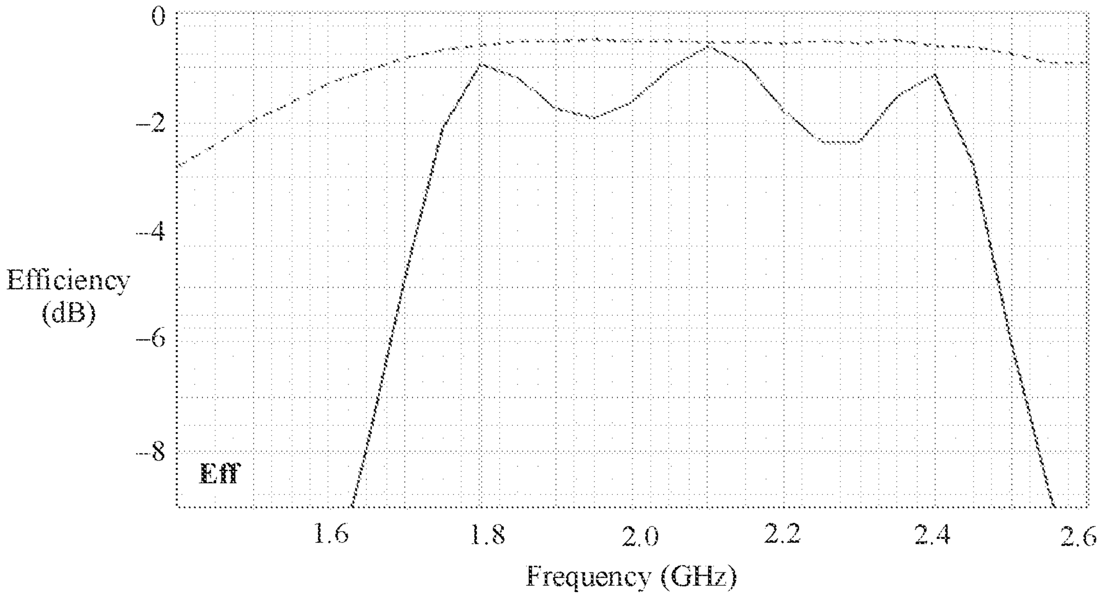
FIG. 25 shows efficiency of the antenna shown in FIG. 23.
Figure 26A:
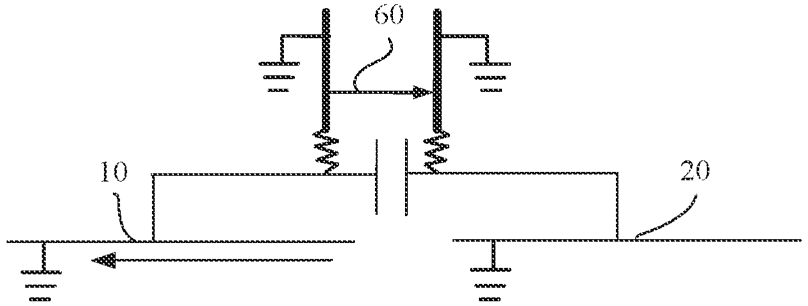
FIG. 26*a* shows current distribution of the antenna shown in FIG. 23 at 2.01 GHz.
Figure 26B:
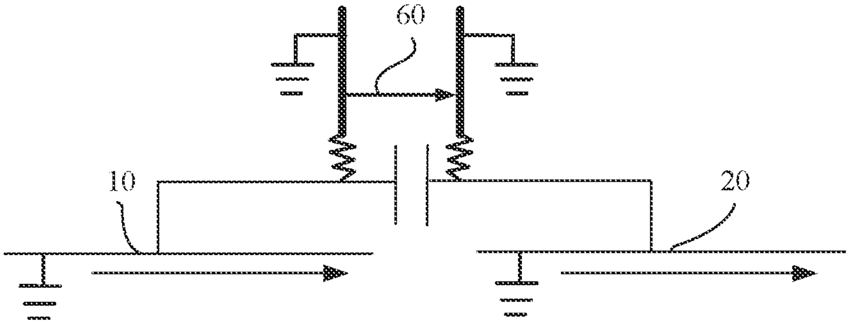
FIG. 26*b* shows current distribution of the antenna shown in FIG. 23 at 2.31 GHz.
Figure 26C:
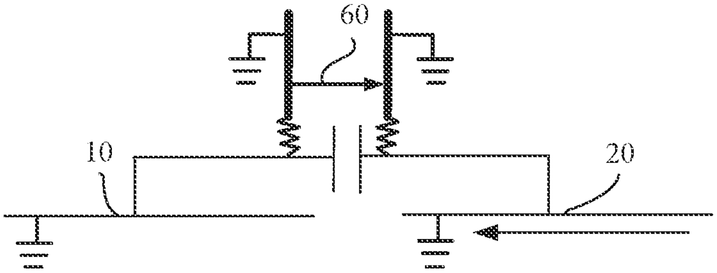
FIG. 26*c* shows current distribution of the antenna shown in FIG. 23 at 2.59 GHz.
Figure 27A:
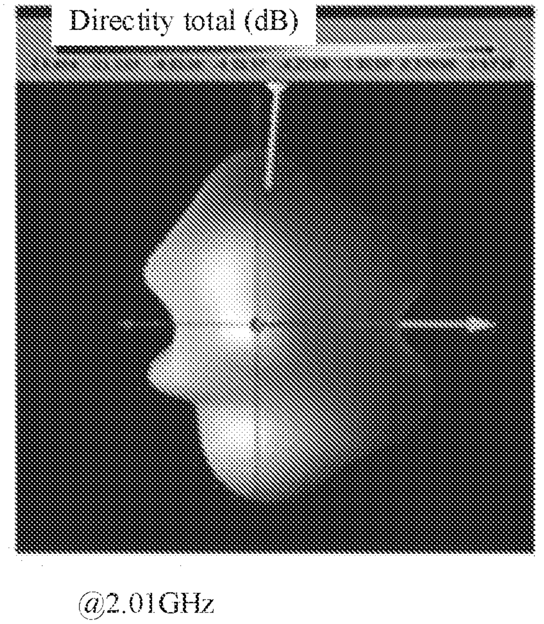
FIG. 27*a* shows a radiation pattern of the antenna shown in FIG. 23 at 2.01 GHz.
Figure 27B:
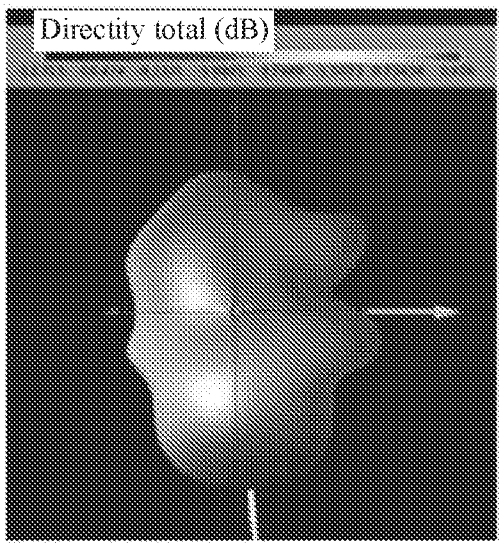
FIG. 27*b* shows a radiation pattern of the antenna shown in FIG. 23 at 2.31 GHz.
Figure 27C:
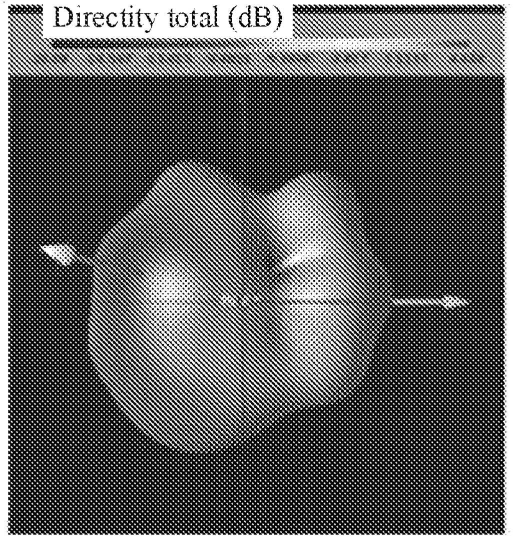
FIG. 27*c* shows a radiation pattern of the antenna shown in FIG. 23 at 2.59 GHz.

Simulation is performed on the antenna shown in FIG. 23. FIG. 24 shows a group of reflection coefficient curves of the antenna simulation, including three resonance modes with resonance frequencies of respectively around 2.01 GHz, 2.31 GHz, and 2.59 GHz. The 2.01 GHz resonance is mainly generated by a left IFA antenna. The 2.31 GHz resonance passes through a component in the second feed network, so that left and right IFA antennas radiate together. The 2.59 GHz resonance is mainly generated by the right IFA antenna. FIG. 25 shows efficiency of an antenna. A solid line represents system efficiency, and a dashed line represents radiation efficiency. It can be learned from FIG. 25 that, in this application, when efficiency is −5 dB, a corresponding frequency band is 300 MHz, and radiation efficiency is over −2 dB. Therefore, the antenna provided in this embodiment of this application has a large bandwidth. Refer to a schematic diagram of a current of an antenna according to this application. FIG. 26*a* shows current distribution of the antenna shown in FIG. 23 at 2.01 GHz, where current is on the first radiator 10 only, and flows from a suspended end to a ground end of the first radiator 10. FIG. 26*b* shows current distribution of the antenna shown in FIG. 23 at 2.31 GHz, where a current is on the first radiator 10 and the second radiator 20, and flows from a ground end to a suspended end. FIG. 26*c* shows current distribution of the antenna shown in FIG. 23 at 2.59 GHz, where a current is only on the second radiator 20, and flows from a suspended end to a ground end. Refer to a radiation pattern of an antenna provided in an embodiment of this application. FIG. 27*a* shows a radiation pattern of the antenna shown in FIG. 23 at 2.01 GHz. FIG. 27*b* shows a radiation pattern of the antenna shown in FIG. 23 at 2.31 GHz. FIG. 27*c* shows a radiation pattern of the antenna shown in FIG. 23 at 2.59 GHz. In the preceding amplitude diagram, an area with a deep gray scale represents strong radiation, and a White area represents weak radiation. It can be learned from FIG. 27*a*, FIG. 27*b*, and FIG. 27*c* that the grayscale occupies most areas in the radiation pattern, and the antenna in this application has a good radiation effect at three resonance frequencies.

FIG. 18 and FIG. 23 show examples in which the first radiator and the second radiator are disposed by using the metal frame. In addition to the foregoing metal frame, a support may be further disposed in the housing of the terminal to carry the first radiator and the second radiator.

For example, two opposite supports are disposed in the terminal. The first radiator is a metal layer disposed on one support, and the second radiator is a metal layer disposed on the other support.

It can be learned from the foregoing description that, in the antenna provided in this application, for two radiators with different electrical lengths, a feed is connected to the two radiators with different electrical lengths, so that a single-feed wideband or multi-frequency antenna structure can be formed. This greatly improves free space or head-hand performance of the antenna. The single-feed antenna has a large aperture and is generally of a low SAR structure. Certainly, a feeding manner shown in FIG. 18 may alternatively be used in the antenna shown in FIG. 23 to feed power. Therefore, the same effect can be achieved in this way.

Figure 28:
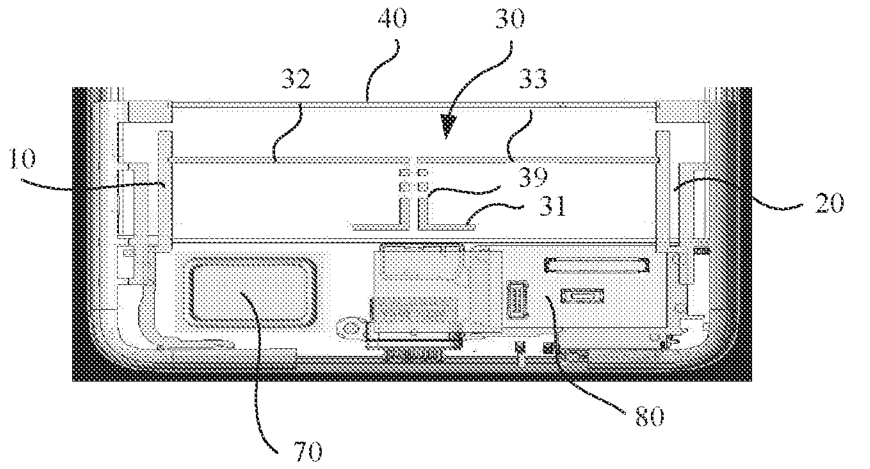
FIG. 28 is a schematic diagram of a structure of the antenna shown in FIG. 2 in a mobile phone according to this application.

FIG. 28 shows an example of a low-frequency antenna in a mobile phone. The antenna, shown in FIG. 28 is a schematic diagram of a structure of the low-frequency antenna shown in FIG. 2 that is actually applied to the mobile phone. As shown in FIG. 28, actual left and right environments in the mobile phone are asymmetric, and antenna clearance is different. As shown in FIG. 28, an SPK module 60 is distributed in a lower left corner of the mobile phone, and an antenna SIM card module 80 is distributed in a lower right corner of the mobile phone. The lower left corner and the lower right corner of the mobile phone refer to corners of a corresponding end close to an unlocking module on the mobile phone. The first radiator 10 and the second radiator 20 of the antenna are separately made of a metal wire in a mobile phone housing, for example, a metal wire disposed on an antenna support, or a metal wire disposed on a printed circuit board. The first radiator 10 and the second radiator 20 are distributed on left and right sides of the mobile phone. Lower ends of the first radiator and the second radiator are grounded, and upper ends of the first radiator and the second radiator are suspended. The antenna in FIG. 28 is fed through the second feed network 30 and the first feed network 40. A second feed 31 of the second feed network 30 is connected to the first radiator 10 by using a third feed line 32, and is connected to the second radiator 20 by using a fourth feed line 33. In FIG. 28, the third feed line 32 and the fourth feed line 33 may be disposed symmetrically, or may be disposed asymmetrically. The deposition manner may be specifically determined according to a deposition position of the second feed 31. When the third feed line 32 and the fourth feed line 33 are disposed asymmetrically, a current path length from the second feed 31 to the first radiator 10 and a current path length from the second feed 31 to the second radiator 20 may be adjusted by disposing a second matching network 39. For specific structures of the second matching network 39 and the second feed network 30, refer to the related description in FIG. 3. The first feed network 40 is a symmetric feed network. For a specific structure of the first feed network 40, refer to the related description in FIG. 4. Details are not described herein again. It can be seen from FIG. 28 that two antennas: an anti-symmetrical feed antenna ant1 and a symmetric feed antenna ant2 may be generated.

Figure 29:
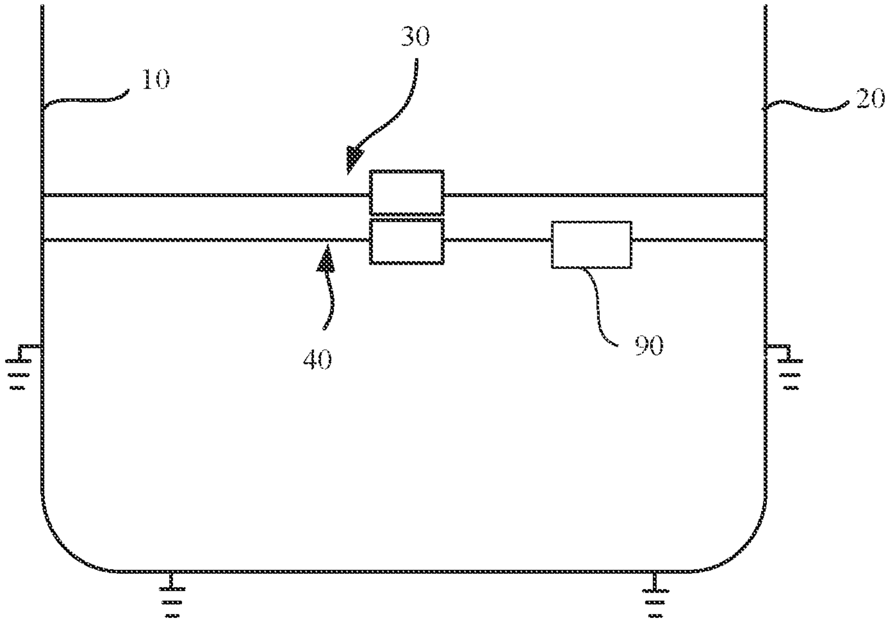
FIG. 29 shows a structure of still another antenna according to an embodiment of this application.

As shown in FIG. 29, a low-frequency antenna is further provided. For reference numerals shown in FIG. 29, refer to related numerals in FIG. 2. A difference from the antenna shown in FIG. 2 lies in that a phase shifter 90 is disposed on a feed line of a feed network, and the phase shifter may be configured to change a phase difference between the antenna ant1 and the antenna ant2. In FIG. 29, the phase shifter 90 is disposed on a feed line (a first feed line or a second feed line) of the first teed network 40. However, in this application, the phase shifter 90 is not specifically limited to being disposed on an anti-symmetric feed power grid, and may be further disposed on the second feed network 30. By using the phase shifter 90 loaded on the feed line, a phase on the radiator may be changed by shifting the phase shifter. This improves damaged isolation after a mobile phone is held.

An embodiment of this application further provides a terminal. The terminal includes a housing and the antenna according to any one of the foregoing implementations. In the foregoing technical solution, antenna isolation can be improved by using the first feed network and the second feed network to feed power to the first radiator and the second radiator that have approximately an equal current path length. When the first feed network or the second feed network is used to feed power to the first radiator and the second radiator that have different current path lengths, a bandwidth of the antenna can be increased, so that performance of the antenna can be improved. The housing may be a metal housing. The metal housing includes a plurality of metal segments, and the first radiator and the second radiator are two metal segments in the plurality of metal segments. This facilitates antenna configuration.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An antenna applied to a terminal and comprising:
- a feed comprising a positive feed electrode and a negative feed electrode;
- a first radiator comprising a first feed point and a first ground point;
- a second radiator comprising a second feed point and a second ground point;
- a connection line comprising:
  - a first end coupled to the first feed point;
  - a second end coupled to the second feed point;
  - a first connection line coupled to the first radiator, wherein a distal end of the first connection line is away from the first radiator and coupled to a first metal wire and grounded, wherein the first metal wire is connected to the positive feed electrode; and
  - a second connection line coupled to the second radiator, wherein a distal end of the second connection line is away from the second radiator and coupled to a second metal wire and grounded, wherein the second metal wire is connected to the negative feed electrode; and
- a feeding point disposed on the connection line and coupled to the feed.

2. The antenna of claim 1, wherein the connection line and a ground connection are the only direct electrical connections between the first radiator and the second radiator.

3. The antenna of claim 1, wherein the first radiator comprises a first end and a second end, wherein both the first end and the second end of the first radiator are open ends, wherein the second ground point of the second radiator is located at a first end of the second radiator, and wherein a second end of the second radiator is an open end.

4. The antenna of claim 1, wherein a first end of the first radiator is an open end, wherein the first ground point is located at a second end of the first radiator, wherein a first end of the second radiator is an open end, and wherein the second ground point is located at a second end of the second radiator.

5. The antenna of claim 1, wherein the first radiator and the second radiator are configured to form two different metal segments of a metal frame of the terminal.

6. The antenna of claim 5, wherein the first radiator further comprises:

a first part of a first long side wall of the metal frame; and a second part of a short side wall of the metal frame, and wherein the second radiator comprises a third part of a second long side wall of the metal frame.

7. The antenna of claim 6, wherein the first end of the connection line is further coupled to the first long side wall, and wherein the second end of the connection line is further coupled to the second long side wall.

8. The antenna of claim 7, wherein the feed is disposed on a circuit board of the terminal, and wherein in a length direction of the short side wall, the first end and the second end of the connection line cross a gap between the circuit board and the metal frame and are coupled to the first long side wall and the second long side wall.

9. The antenna of claim 5, wherein the first radiator comprises a first part of a first long side wall of the metal frame, and wherein the second radiator comprises a second part of a second long side wall of the metal frame.

10. The antenna of claim 5, wherein the first radiator comprises:

a first part of a first long side wall of the metal frame; and a second part of a first short side wall of the metal frame, and wherein the second radiator comprises:

a third part of a second long side wall of the metal frame; and a fourth part of a second short side wall of the metal frame.

11. The antenna of claim 1, wherein two supports are disposed in the terminal, wherein the first radiator is a first metal layer disposed on a first support of the two supports, and wherein the second radiator is a second metal layer disposed on a second support of the two supports.

12. The antenna of claim 1, further comprising a feed network, and wherein the feed comprises:

a negative electrode that is grounded; and a positive electrode coupled to the feeding point through the feed network.

13. The antenna of claim 1, further comprising a matching network comprising:

a first inductor disposed on the second metal wire;

a second inductor disposed on the first metal wire; and a capacitor disposed between the first connection line and the second connection line.

14. A terminal comprising:

a housing; and an antenna disposed in the housing and comprising:

a feed comprising a positive feed electrode and a negative feed electrode;

a first radiator comprising a first feed point and a first ground point;

a second radiator comprising a second feed point and a second ground point;

a connection line comprising:

a first end coupled to the first feed point;

a second end coupled to the second feed point;

a first connection line coupled to the first radiator, wherein a distal end of the first connection line is away from the first radiator and coupled to a first metal wire and grounded, wherein the first metal wire is connected to the positive feed electrode; and a second connection line coupled to the second radiator, wherein a distal end of the second connection line is away from the second radiator and coupled to a second metal wire and grounded, wherein the second metal wire is connected to the negative feed electrode; and a feeding point disposed on the connection line and coupled to the feed.

15. The terminal of claim 14, wherein the connection line and a ground connection are the only direct electrical connections between the first radiator and the second radiator.

16. The terminal of claim 14, wherein both ends of the first radiator are open ends, wherein the second ground point of the second radiator is located at a first end of the second radiator, and wherein a second end of the second radiator is an open end.

17. The terminal of claim 14, wherein a first end of the first radiator is an open end, wherein the first ground point is located at a second end of the first radiator, wherein a first end of the second radiator is an open end, and wherein the second ground point is located at a second end of the second radiator.

18. The terminal of claim 14, further comprising a matching network comprising:

a first inductor disposed on the second metal wire;

a second inductor disposed on the first metal wire; and a capacitor disposed between the first connection line and the second connection line.

19. An antenna applied to a terminal and comprising:

a feed network;

a feed comprising:

a negative electrode that is grounded; and a positive electrode;

a first radiator comprising a first feed point and a first ground point;

a second radiator comprising a second feed point and a second ground point;

a connection line comprising:

a first end coupled to the first feed point; and a second end coupled to the second feed point;

a feeding point disposed on the connection line and coupled to the feed, wherein the positive electrode coupled to the feeding point through the feed network;

a first metal wire coupled to the feeding point and comprising a first end, wherein the positive electrode of the feed is connected to a first end of the first metal wire that is far away from the feeding point;

a second metal wire having a proximate end coupled to the first end of the first metal wire and having a distal end away from the first metal wire and grounded; and a third metal wire having a proximate end coupled to the first end of the first metal wire and having a distal end away from the first metal wire and grounded.

20. The antenna of claim 19, further comprising a matching network comprising:

a capacitor disposed on the first metal wire;

a first inductor disposed on the third metal wire; and a second inductor disposed on the second metal wire.

* * * * *